United States Patent
Ishibashi et al.

(10) Patent No.: US 9,842,326 B2
(45) Date of Patent: Dec. 12, 2017

(54) INFORMATION PROVIDING SYSTEM AND INFORMATION PROVIDING METHOD USING AN AUTOMATIC TRANSACTION APPARATUS

(71) Applicants: FUJITSU LIMITED, Kawasaki-shi, Kanagawa (JP); FUJITSU FRONTECH LIMITED, Inagi-shi, Tokyo (JP)

(72) Inventors: Kazuo Ishibashi, Kamakura (JP); Chie Matsumura, Saitama (JP); Kanako Yoshida, Kawasaki (JP); Yayoi Ueki, Kawasaki (JP); Mari Nakazato, Kawasaki (JP); Satoshi Mukogawa, Inagi (JP); Sagiri Okamura, Inagi (JP)

(73) Assignees: FUJITSU LIMITED, Kawasaki (JP); FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 15/151,095

(22) Filed: May 10, 2016

(65) Prior Publication Data
US 2016/0335855 A1    Nov. 17, 2016

(30) Foreign Application Priority Data
May 11, 2015    (JP) .................................. 2015-096937

(51) Int. Cl.
*G06Q 20/10*    (2012.01)
*G07F 19/00*    (2006.01)

(52) U.S. Cl.
CPC ......... *G06Q 20/1085* (2013.01); *G07F 19/20* (2013.01)

(58) Field of Classification Search
CPC ........................... G06Q 20/1085; G07F 19/20
USPC ........................................................ 235/379
See application file for complete search history.

(56) References Cited

U.S. PATENT DOCUMENTS

| | | | | |
|---|---|---|---|---|
| 2001/0051876 A1* | 12/2001 | Seigel | ................. | G06F 17/3087 705/26.1 |
| 2003/0040959 A1* | 2/2003 | Fei | .......................... | G06Q 20/10 705/14.4 |
| 2013/0246274 A1* | 9/2013 | Marcous | ................. | G06Q 20/10 705/44 |
| 2014/0089187 A1* | 3/2014 | Meek | ................. | G06Q 30/0241 705/43 |

FOREIGN PATENT DOCUMENTS

| | | |
|---|---|---|
| JP | 9-102080 A | 4/1997 |
| JP | 2012-168805 A | 9/2012 |

* cited by examiner

*Primary Examiner* — Toan Ly
(74) *Attorney, Agent, or Firm* — Westerman, Hattori, Daniels & Adrian, LLP

(57) ABSTRACT

An information providing system includes: a processor that executes a process including: receiving an identifier to uniquely identify an automatic transaction apparatus in which transaction is performed, and an input of a financial institution code read from a card inserted into the automatic transaction apparatus; determining information to be output in the automatic transaction apparatus, based on a relation between the financial institution code and the identifier of the automatic transaction apparatus; and displaying the determined information on a screen of the automatic transaction apparatus or an external display device controlled by the automatic transaction apparatus.

9 Claims, 21 Drawing Sheets

FIG.9
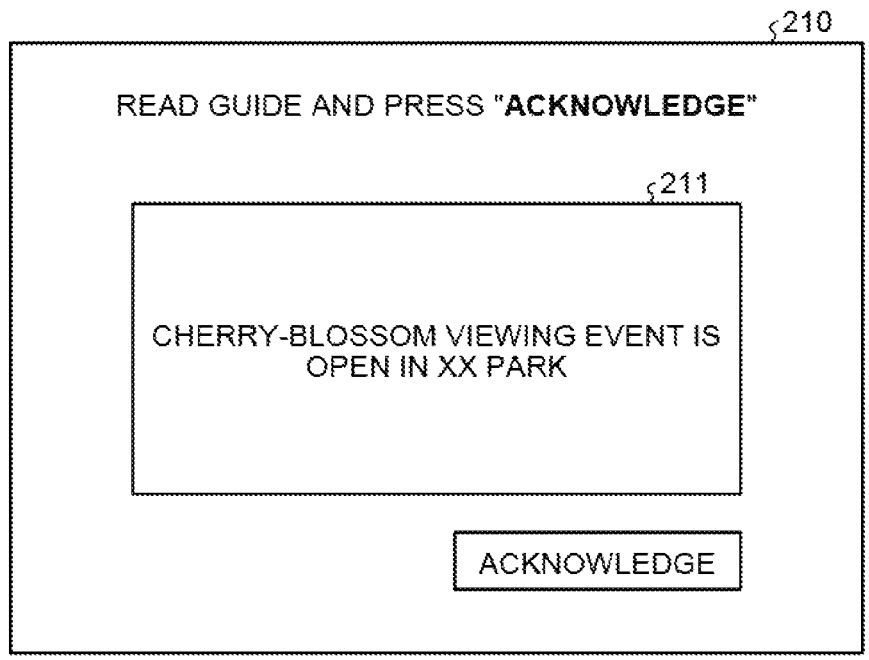
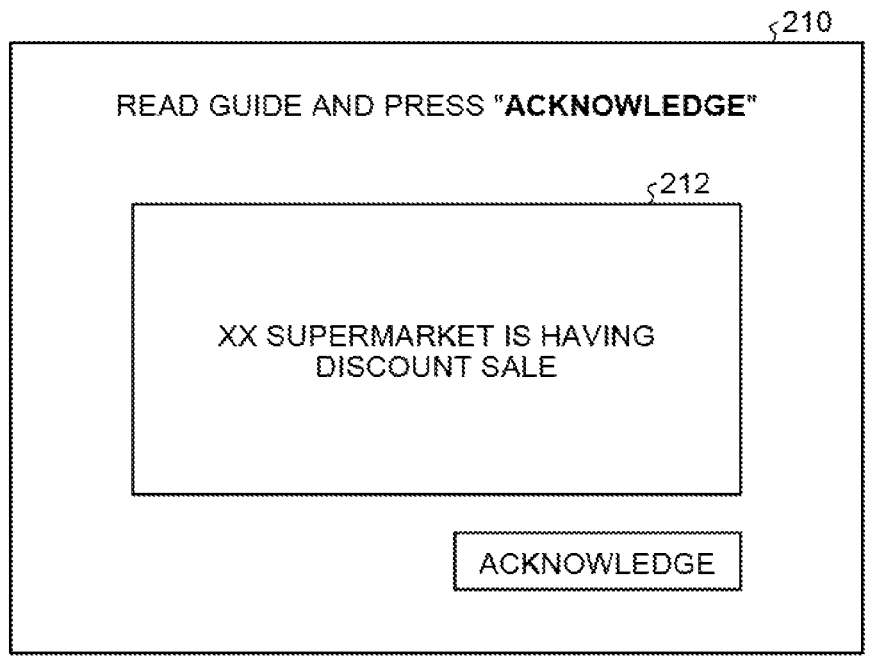

INFORMATION PROVIDING SYSTEM AND INFORMATION PROVIDING METHOD USING AN AUTOMATIC TRANSACTION APPARATUS

CROSS-REFERENCE TO RELATED APPLICATION

This application is based upon and claims the benefit of priority of the prior Japanese Patent Application No. 2015-096937, filed on May 11, 2015, the entire contents of which are incorporated herein by reference.

FIELD

The embodiments discussed herein are related to an information providing system and an information providing method.

BACKGROUND

A technique exists to provide various service information corresponding to customer information on a display, in automatic transaction apparatuses such as automatic teller machines (ATM) installed in banking offices of financial institutions (such as banks and credit card companies) and convenience stores, in addition to performing automatic transactions with customers (users). Conventional technologies are described in Japanese Laid-Open Patent Publication No. 9-102080 and Japanese Laid-open Patent Publication No. 2012-168805, for example.

However, the related art described above has the problem that providing information corresponding to the user is difficult in some cases. For example, the user may use an automatic transaction apparatus of a financial institution (another bank or credit card company) that is different from the bank in which the user has one's account, in a visiting place that is distant from the user's usual living sphere, such as the user's living place and the working place. When the user uses an ATM in the visiting place, there are cases where the user's customer information is not registered in the financial institution of the automatic transaction apparatus, and the ATM has difficulty in providing information corresponding to the user.

SUMMARY

According to an aspect of the embodiments, an information providing system includes: a processor that executes a process including: receiving an identifier to uniquely identify an automatic transaction apparatus in which transaction is performed, and an input of a financial institution code read from a card inserted into the automatic transaction apparatus; determining information to be output in the automatic transaction apparatus, based on a relation between the financial institution code and the identifier of the automatic transaction apparatus; and displaying the determined information on a screen of the automatic transaction apparatus or an external display device controlled by the automatic transaction apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is an explanatory drawing illustrating display of guide information;

DESCRIPTION OF EMBODIMENTS

Figure 1:
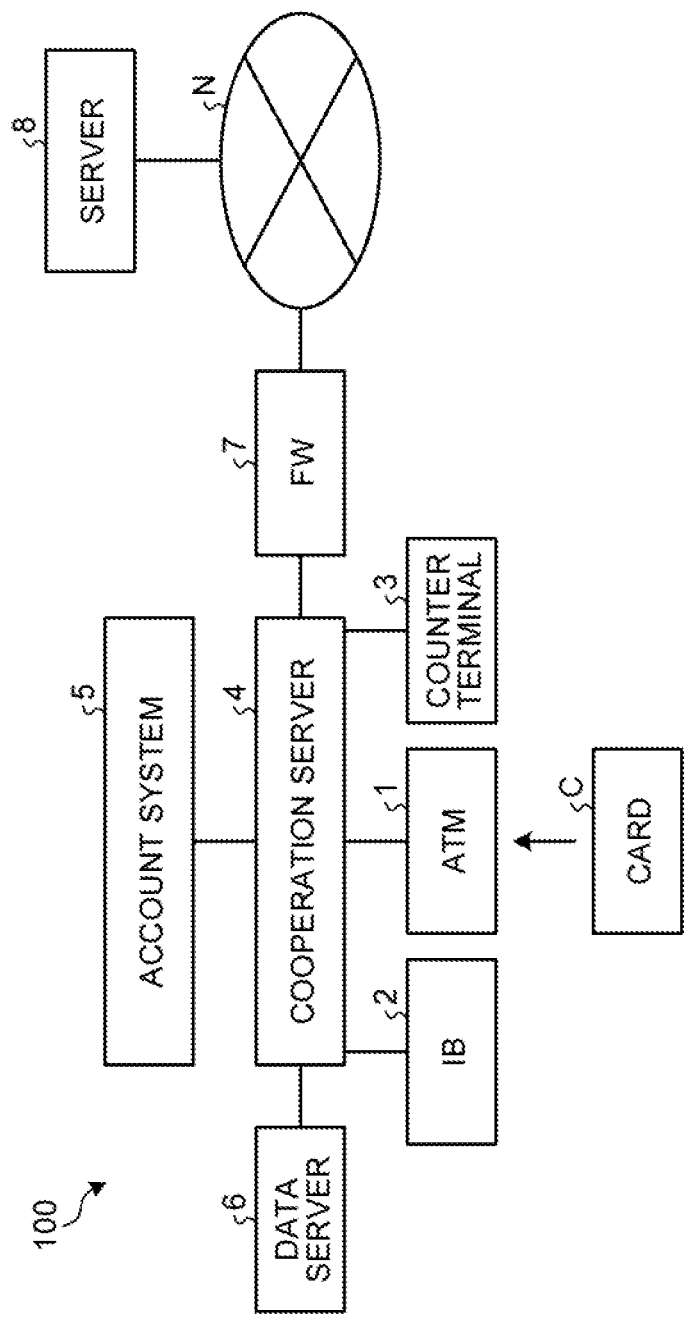
FIG. 1 is an explanatory drawing illustrating a configuration example of a bank system according to a first embodiment.

Preferred embodiments will be explained with reference to accompanying drawings. In the embodiments, the same reference numerals are assigned to constituent elements having the same functions, and overlapping explanation thereof is omitted. The information providing systems and the information providing methods described in the following embodiments are mere examples, and are not intended to limit the embodiments. The following embodiments may be properly combined within a range that is not contradictory.

[a] First Embodiment

FIG. 1 is an explanatory drawing illustrating a configuration example of a bank system 100 according to a first embodiment. As illustrated in FIG. 1, the bank system 100 includes an ATM 1, an IB 2, a counter terminal 3, a cooperation server 4, an account system 5, a data server 6, and an FW 7. These units are connected to mutually communicate with each other, via a dedicated line or a closed network such as a virtual private network (VPN). The term "ATM" is an abbreviation for "Automatic Teller Machine". The term "IB" is an abbreviation for "Internet Banking". The term "FW" is an abbreviation for "Firewall". The IB 2 may be omitted.

The ATM 1 is an apparatus that executes various transactions such as deposit, withdrawal, transfer, and balance inquiry, using a bankbook or a card C such as a cash card and a credit card. The ATM 1 is also referred to as an automatic teller machine. The ATM 1 is an example of an automatic transaction apparatus. The following explanation is made using an ATM as a representative of an automatic transaction apparatus.

Figure 2:
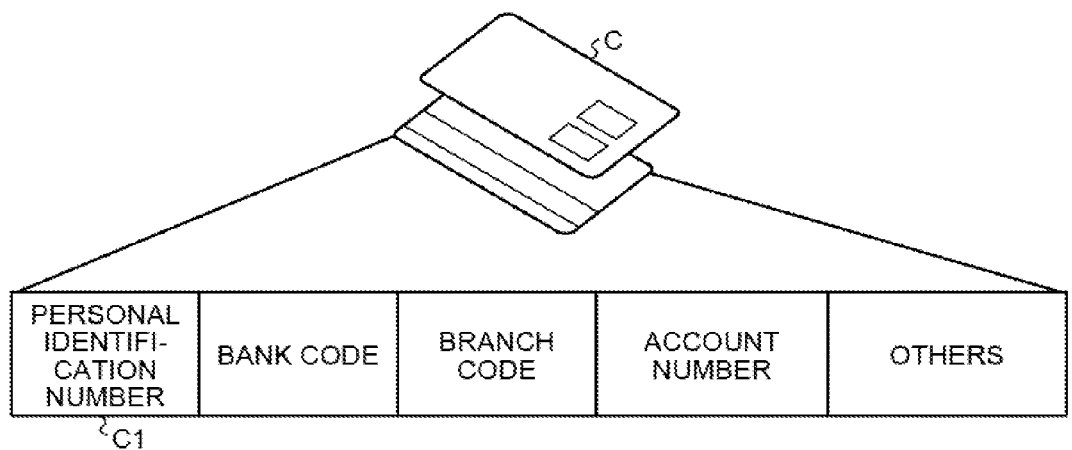
FIG. 2 is an explanatory drawing illustrating a card.

FIG. 2 is an explanatory drawing illustrating a card C. As illustrated in FIG. 2, as an example, the card C is a bank card storing information relating to a bank account of the customer in a magnetic stripe or an IC chip. The recording data C1 stored in the card C includes a personal identification number, a bank code, a branch code, an account number, and the like.

The contents of the recording data C1 are provided in a unified format in the card C that is usable in financial institutions, such as a cash card and a credit card. For example, the bank code is a financial institution code representing the financial institution, for example, unique numbers assigned to respective banks. In the following explanation, the financial institution code may be expressed as a bank code. For example, when the card C is a cash card for using an account of "XX bank", the bank code representing "XX bank" is described in the recording data C1. Accordingly, referring to the bank code of the recording data C1 enables recognition as to whether the transaction is transaction in the account opened in the bank (the own bank) in the bank system 100, or transaction in the account opened in another bank system (another bank).

The branch code is a code representing a branch of the bank, for example, unique numbers assigned to respective branches. For example, when the card C is a cash card for using an account in "YY branch", the branch code representing "YY branch" is described in the recording data C1. Accordingly, referring to the branch code in the recording data C1 enables recognition as to of which branch the account is to be used.

Figure 3:
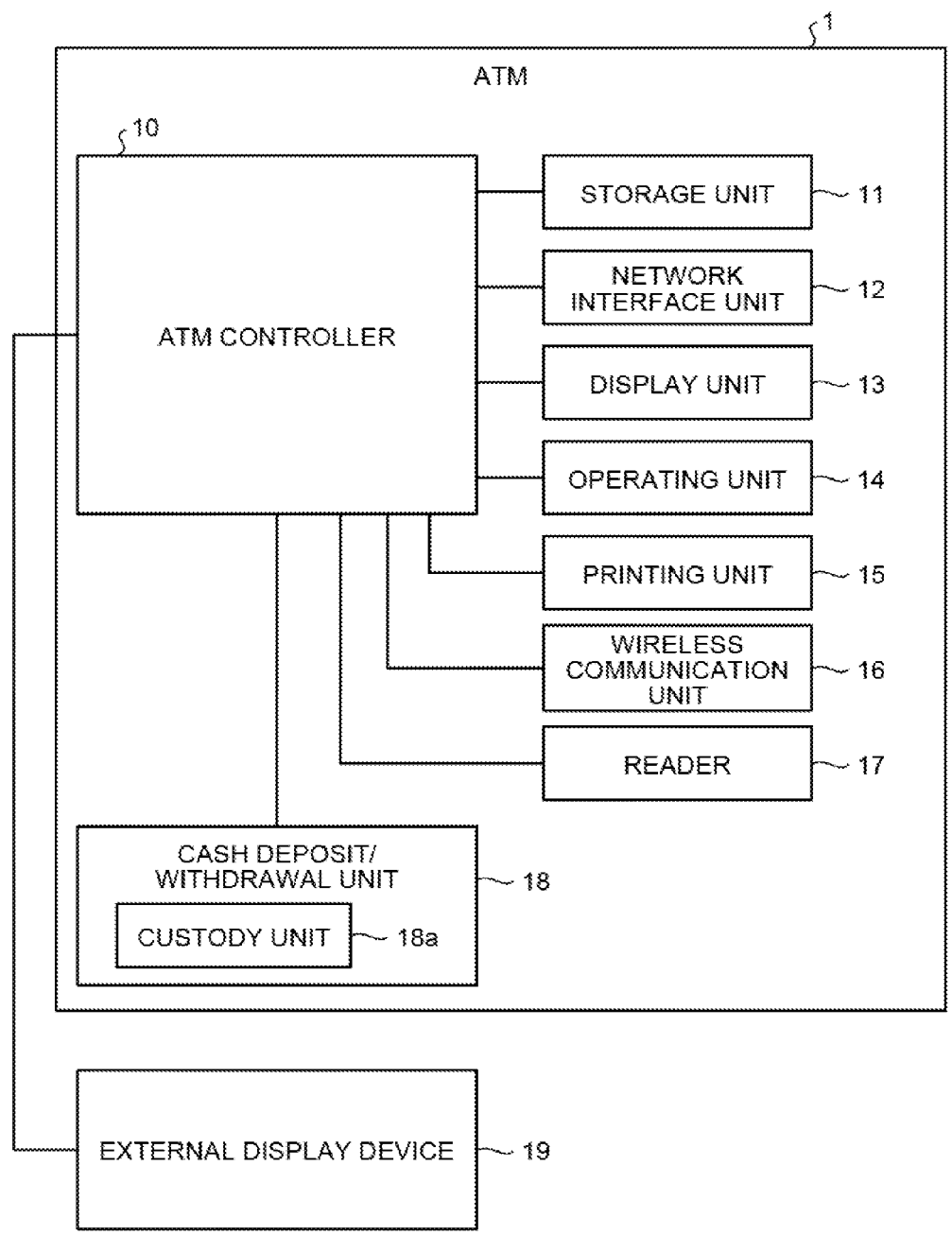
FIG. 3 is a block diagram illustrating a configuration example of an ATM.

FIG. 3 is a block diagram illustrating a configuration example of the ATM 1. As illustrated in FIG. 3, the ATM 1 includes an ATM controller 10, a storage unit 11, a network interface unit 12, a display unit 13, an operating unit 14, a printing unit 15, a wireless communication unit 16, a reader 17, and a cash deposit/withdrawal unit 18. Any of these constituent blocks may be plural.

The ATM controller 10 is a central processing unit (CPU) or the like, and controls operations of the whole ATM 1. Specifically, the ATM controller 10 successively executes a program stored in the storage unit 11, to execute communication processing with an external apparatus such as the cooperation server 4 connected via a closed network, and transaction processing such as authentication of the account, balance inquiry, and settlement.

The storage unit 11 includes a random access memory (RAM), a read only memory (ROM), a hard disk drive (HDD), and the like. The storage unit 11 stores therein various types of information, such as the program to be executed, by the ATM controller 10, and an identifier (ATM identifier) that is uniquely set for the ATM 1. The storage unit 11 also provides a work area used when the ATM controller 10 executes the program. The ATM identifier is, for example, an identification code that is preset, to uniquely identify the ATM 1.

The cooperation server 4 or the account, system 5 is capable of identifying the ATM 1 that has received a transaction request by obtaining the ATM identifier from the ATM 1. For example, the cooperation server 4 or the account system 5 refers to installation information describing the financial institution (such as the bank name and the bank code) in which the ATM 1 is installed, the branch name, and the installation place (address) for each ATM identifier, to identify the installation area of the ATM 1.

The network interface unit 12 is an interface unit to connect to the closed network to which the cooperation server 4 and the like are connected. The display unit 13 is a device such as a liquid crystal display (LCD) that displays a message or the like for the customer (user). The operating unit 14 is a device that receives user's operations. The display unit 13 and the operating unit 14 may be a unified device such as a touch panel. The printing unit 15 is a device that prints usage details such as a copy of usage of transaction processing on a paper medium such as roll paper. The following explanation illustrates an example where the printing unit 15 performs printing on a receipt, but the output medium of the printing unit 15 is not limited to receipts. Examples of the output medium are withdrawal/deposit statements, bankbooks, and printer paper.

The wireless communication unit 16 is a communication interface that performs short-range wireless communication such as near field communication (NFC), under the control of the ATM controller 10. The wireless communication unit 16 is provided, for example, in the vicinity of the operating unit 14 of the housing of the ATM 1, and performs short-range wireless communication with a mobile terminal (not illustrated) such as a smartphone, when the user brings the mobile terminal close to the wireless communication unit 16. The reader 17 reads the magnetic stripe or the IC chip of the card C. The cash deposit/withdrawal unit 18 is a device that receives and outputs cash, and includes a custody unit 18a that keeps bills and coins.

The external display device 19 is a device such as an liquid crystal display (LCD) that is provided outside together with the ATM, to display a message or the like for the customer (user) under the control of the ATM controller 10.

As an embodiment, the ATM 1 executes user authentication using the personal identification number and/or the biological information that are input to the ATM 1, before or after receiving a transaction request with a menu picture displayed on the display unit 13 by the operating unit 14, under the control of the ATM controller 10.

For example, when the card C is used, the ATM 1 reads the recording data C1 recorded on the card C inserted through an insertion port that is not illustrated, by the reader 17. Thereafter, the ATM 1 transmits the recording data C1 read from the card C and the ATM identifier to the account system 5 via the cooperation server 4, together with the authentication information that is input via the operating unit 14, such as the personal identification number. When the account system 5 determines that the personal identification number agrees, the user of the ATM 1 is authenticated as the user oneself of the account. In this case, the ATM 1 requests the account system 5 via the cooperation server 4 to perform transaction that is input before identity verification, or notify another system via the network of a request of transaction other than financial transaction input via the menu picture after success in identity verification. The cash deposit/withdrawal unit IB counts and stores money inserted from the money insertion port (not illustrated) in the custody unit 18a, when money is deposited in transaction after authentication. The cash deposit/withdrawal unit IS counts and pays out the money stored in the custody unit 18a in withdrawal to the money outlet port (not illustrated).

The explanation illustrates the case where the card C is used in the ATM 1, but biological information such as a fingerprint, the iris, and the vein on the palm can be used for identity verification instead of the personal identification number. In this case, the user is requested to input the date of birth together with the biological information, to narrow down the registered biological information to be subjected to 1-to-N authentication with the biological information input to the ATM 1 using the date of birth. This structure removes the necessity for the user to always input the personal identification number in use of the ATM 1.

The IB 2 provides services relating to the internet banking (IB). Specifically, the IB 2 includes an IB server (not illustrated) that provides IB services, and receives accesses from the user's terminals (not illustrated) such as personal computers, smartphones, and mobile phones, to execute various transactions.

As an embodiment, the user can be provided with services relating to internet banking, through a browser or the like that operates on the user's terminal. For example, the user's terminal accesses a login uniform resource locator (URL) open to the public by the bank on the Internet. Thereafter, the terminal transmits account information, such as the identifier (ID) and the password, that the terminal has received via a user interface (not illustrated) to the IB server. Using the account information, the IB server executes login authentication as identity verification. As a result, when the login authentication succeeds, the services relating to the internet banking are opened to the user's terminal. After such services are opened, the user's terminal is enabled to request the account system 5 via the cooperation server 4 and the IB server to perform various menu, that is, transactions such as balance inquiry, transfer, and transfer between user's accounts in the same branch.

The counter terminal 3 is a terminal device that is used by the clerk at the counter, that is, the teller. According to an embodiment, the counter terminal 3 receives an input of type of transaction and sum of transaction according to the slip written by the customer, and requests the account system 5 via the cooperation server 4 to perform online processing relating to the transaction. The counter terminal 3 is connected with a teller cash processor that is not illustrated, to enable deposit and withdrawal of money in accordance with the sum of deposit or withdrawal received from the counter terminal 3, while storing and managing the sum of money stored in the storage unit of the cash processor or the number of money of respective denominations.

The cooperation server 4 is a server device that provides cooperation services to perform transaction in the account system 5 by the ATM 1, the IB 2, or the counter terminal 3 in cooperation. As a mounting example, the cooperation server 4 may be mounted as a Web server that achieves the cooperation services described above, or may be mounted as a cloud that provides the cooperation service by outsourcing. As another mounting example, the cooperation server 4 may be mounted by preinstalling or installing a cooperation program provided as service oriented architecture (SOA), package software, or online software in a desired computer.

In the case where the cooperation server 4 is mounted in any of these forms, the cooperation server 4 is not necessarily mounted as an external device of the account system 5, but the account system 5 may provide the function achieved by the cooperation server 4.

Figure 4:
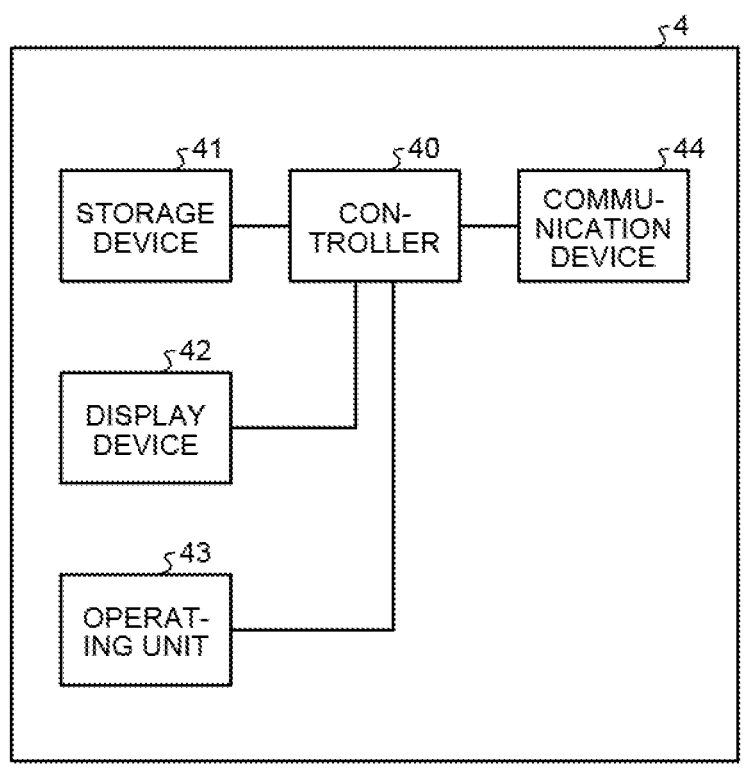
FIG. 4 is a block diagram illustrating a configuration example of a cooperation server.

FIG. 4 is a block diagram illustrating a configuration example of the cooperation server 4. As illustrated in FIG. 4, the cooperation server 4 includes a controller 40, a storage device 41, a display device 42, an operating unit 43, and a communication device 44.

The controller 40 is a central processing unit (CPU) or the like, and develops and successively executes the program stored in the ROM, the HDD, or the like of the storage device 41 onto the RAM of the storage device 41, to control operations of the whole cooperation server 4. The storage device 41 is a RAM, a ROM, an HDD, or the like, and stores therein the program to be executed by the controller 40, various setting information, and information obtained from the server 8 connected with the external communication network N via the FW 7.

The display device 42 is a display such as an LCD, and displays various types of information on the screen thereof under the control of the controller 40. The operating unit 43 is an input interface such as a keyboard and a mouse, and receives operation inputs of the user (the operator of the cooperation server 4). The communication device 44 performs communication via the closed network of the bank system 100, under the control of the controller 40. The cooperation server 4 performs communication by the communication device 44, to perform transmission and reception of data with the ATM 1, the IB 2, the counter terminal 3, the account system 5, the data server 6, and the FW 7 in the bank system 100.

The account system 5 is an information system executing processing relating to various transactions of the bank. For example, when the account system 5 receives a processing request relating to transaction from the ATM 1, the IB 2, or the counter terminal 3, the account system 5 executes processing corresponding to the transaction, such as deposit, withdrawal, transfer, transfer between user's accounts in the same branch, and balance inquiry, on the account corresponding to the received account number of the customer.

The data server 6 is a server apparatus that manages various types of information in the bank. The information managed by the data server 6 includes customer information such as marketing customer information file (MCIF) describing various types of information for customers who opened accounts, and loan information describing various types of information as to loan customers. The cooperation server 4 may achieve the function provided by the data server 6.

The FW 7 controls communications between the closed network of the bank system 100 and the communication network N such as the Internet outside. For example, the FW 7 shots off an access from the communication network N side, and allows an access from an apparatus (such as the cooperation server 4) on the closed network of the bank system 100 to the server 8 or the like on the communication network N, to maintain safety of the closed network of the bank system 100.

The server 8 is a server apparatus that provides various types of information on the communication network N. For example, the server 8 is a Web server that distributes various types of information in a predetermined area by private enterprises and administrations such as local governments. Specifically, the server 8 distributes information (hereinafter referred to as sightseeing information) mainly for tourists, such as various events, special products, tourist attractions, and restaurants in the area. The server 8 also distributes information (hereinafter referred to as life information) mainly for local people in the area, such as advertisements (such as coupons) of certain shops, disaster prevention information, traffic information, and weather information in the area. The sightseeing information or the life information can be obtained by accessing the URL (Uniform Resource Locator) that discloses the sightseeing information or the URL that discloses the life information.

Figure 5:
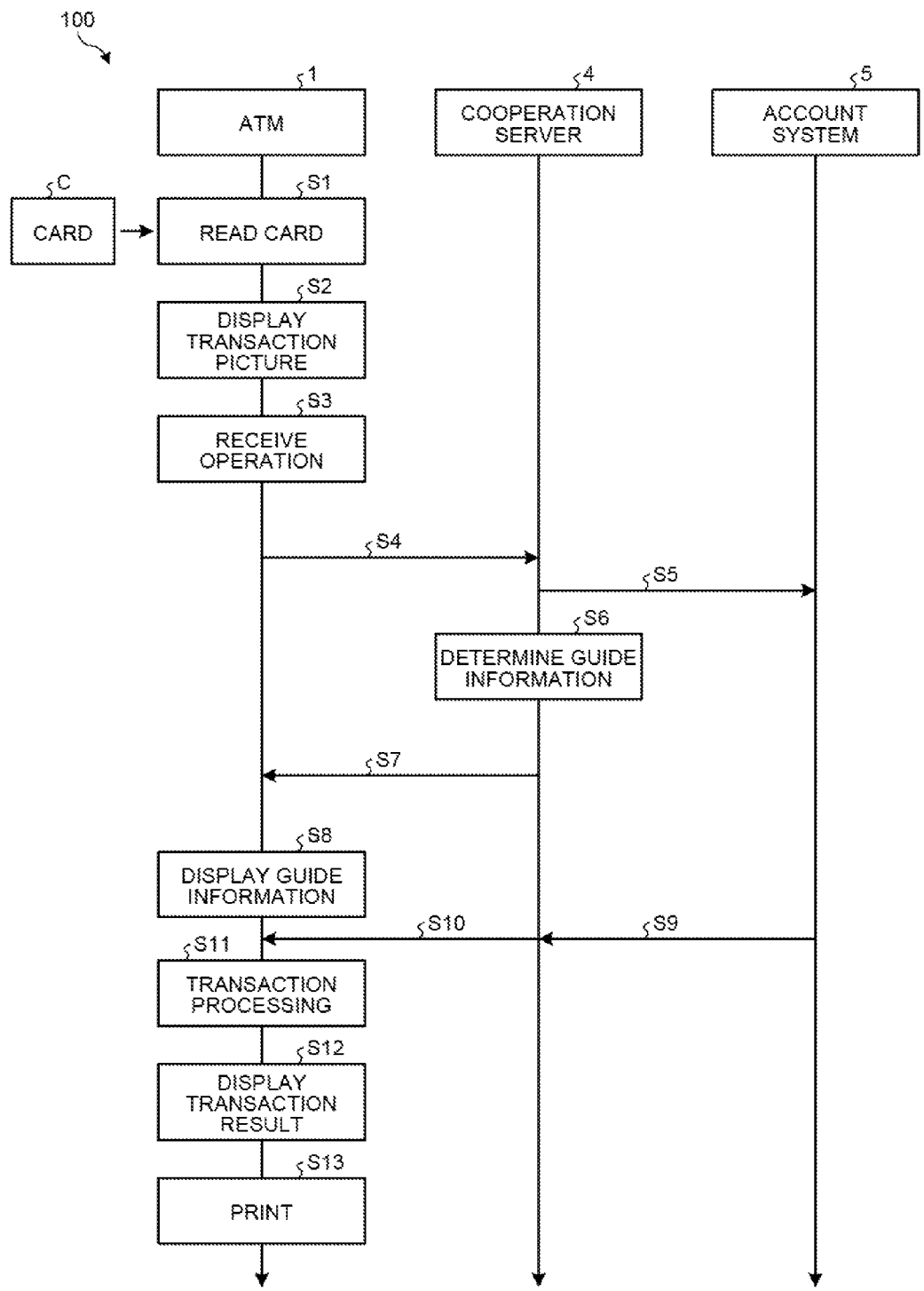
FIG. 5 is a ladder chart illustrating an operation example of the bank system according to the first embodiment.

FIG. 5 is a ladder chart illustrating an operation example of the bank system 100 according to the first embodiment. Specifically, FIG. 5 illustrates operations of the bank system 100 in the case where the customer (user) who holds the card C performs transaction in the ATM 1.

As illustrated in FIG. 5, the ATM 1 reads the card C inserted through the insertion port with the reader 17 (S1), under the control of the ATM controller 10. By the reading at S1, the ATM 1 obtains recording data C1 including the bank code, the branch code, and the account number for the account of the user from the card C.

Thereafter, the ATM controller 10 displays a transaction picture on the display unit 13 (S2), and receives an operation for the transaction from the user from the operating unit 14 (S3). With operations on the transaction picture at S2 and S3, the ATM 1 receives selection of the transaction, and setting of transaction details in the selected transaction from the user. The present embodiment illustrates the structure of reading the card C before the operation on the transaction picture, but the card C may be read after transaction setting on the transaction picture. For example, S1 may be performed after S2 and S3.

Figure 6:
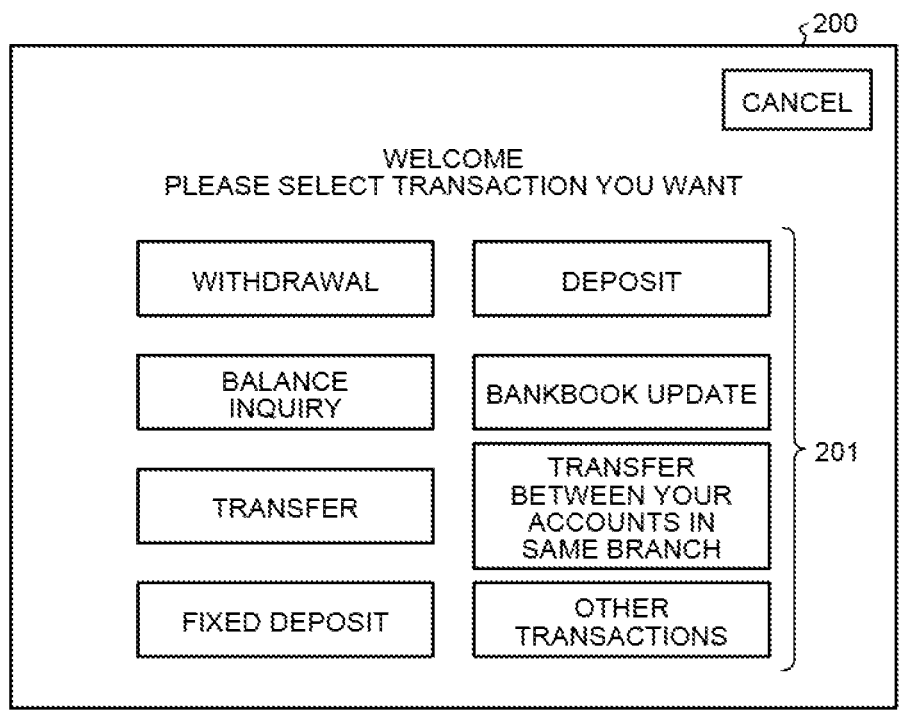
FIG. 6 is an explanatory drawing illustrating a transaction picture.

FIG. 6 is an explanatory drawing illustrating a transaction picture 200. As illustrated in FIG. 6, the display unit 13 of the ATM 1 displays the transaction picture 200 including button images 201 to select various transactions such as withdrawal, deposit, balance inquiry, and bankbook update for the account of the card C. The user performs an operation (such as a touch operation) to select the button image 201 via the operating unit 14, to select the type of transaction. After the type of transaction is selected, the ATM controller 10 of the ATM 1 receives information as to the transaction sum such as the sum of the transaction type and the deposit sum, an input of the account number read from the card C, and an input of the personal identification number via the operating unit 14.

Thereafter, the ATM controller 10 of the ATM 1 transmits the recording data C1 obtained from the card C, information as to the transaction received on the transaction picture 200 from the operating unit 14, and the ATM identifier of the ATM 1, to the cooperation server 4 via the network interface unit 12 (S4). The controller 40 of the cooperation server 4 receives the information transmitted from the ATM 1 at S4 by the communication device 44. Thereafter, the controller 40 of the cooperation server 4 transmits information used for various transactions of the bank, such as the recording data C1, information as to the transaction, and the ATM identifier, to the account system 5 by the communication device 44 (S5). In this manner, the account system 5 executes processing corresponding to the transaction, such as deposit, withdrawal, transfer, transfer between user's accounts in the same branch, and balance inquiry. The information transmitted at S5 may be transmitted from the ATM 1 to the account system 5 without through the cooperation server 4.

Thereafter, the controller 40 of the cooperation server 4 performs determination processing to determine guide information to be output in the ATM 1, based on the relation between the ATM identifier obtained from the ATM 1 and the bank code read from the card C (S6). As described above, in the case where the account system 5 provides the function to be achieved by the cooperation server 4, because the flow illustrating the processing by the cooperation server 4 is united with the flow illustrating the account system 5 in the ladder chart of FIG. 5, the processing of S6 may be modified to be executed by the account system 5.

Figure 7:
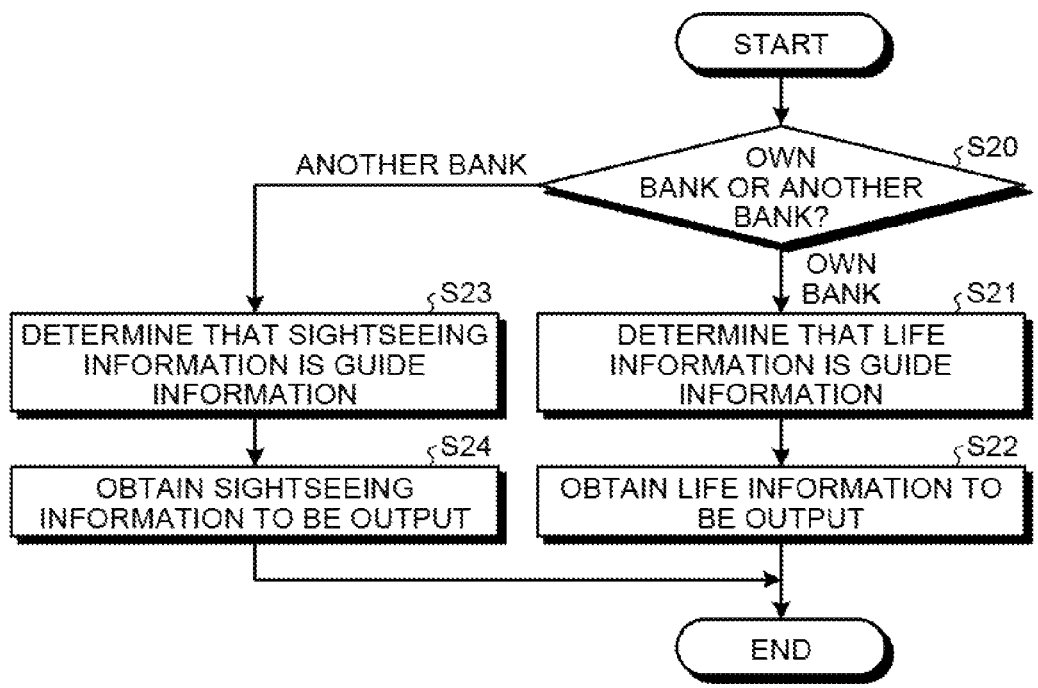
FIG. 7 is a flowchart illustrating an example of determination processing.

FIG. 7 is a flowchart illustrating an example of the determination processing executed at S6. As illustrated in FIG. 7, when the determination processing is started, the controller 40 of the cooperation server 4 determines whether the transaction is transaction in the own bank or transaction in another bank (S20), based on the ATM identifier obtained from the ATM 1 and the bank code read from, the card C.

Specifically, the controller 40 determines that the transaction is transaction in the own bank, when the financial institution specified by the ATM identifier agrees with the financial institution specified by the bank code read from the card C. The controller 40 determines that the transaction is transaction in another bank, when the financial institution specified by the ATM identifier does not agree with the financial institution specified by the bank code read from the card C.

When the bank is the own bank at S20, the controller 40 determines that life information is the guide information (S21), and obtains life information to be output in the ATM 1 from the server 8 (S22). Specifically, the controller 40 reads the URL of the server 8 that discloses the life information from the setting information stored in advance in the storage device 41, and accesses the read URL to obtain the life information.

When the bank is another bank at S20, the controller 40 determines that sightseeing information is the guide information (S23), and obtains sightseeing information to be output in the ATM 1 from the server 8 (S24). Specifically, the controller 40 reads the URL of the server 8 that discloses the sightseeing information from the setting information stored in advance in the storage device 41, and accesses the read URL to obtain the sightseeing information.

In FIG. 7, the controller 40 may perform the processing at S20 with the condition "the own bank or another bank" replaced by the condition "visitor or not visitor". Specifically, when the financial institution specified by the bank code read from the card C is a financial institution and a regional bank different from the own bank and the area in which branches of the regional bank exist can be specified, the controller 40 can determine that the customer is "visitor" when the installed area of the ATM specified by the ATM identifier does not agree with the area in which the financial institution specified by the bank code read from the card C is located, and the controller 40 can determine that the customer is "not visitor" when the areas agree. When the controller 40 determines that the customer is "visitor", the processing is changed to S23 as in the case of determining that the bank is "another bank" in FIG. 7. When the controller 40 determines that the customer is "not visitor", the processing is changed to S21 as in the case of determining that the bank is "own bank".

With reference to FIG. 5 again, the controller 40 of the cooperation server 4 transmits the guide information determined in the determination processing at S6 to the ATM 1 by the communication device 44 (S7). The ATM controller 10 of the ATM 1 receives the guide information transmitted from the cooperation server 4 at S7 by the network interface unit 12, to perform display processing to display the received guide information on the display unit 13 or the external display device 19 (S8).

Figure 8:
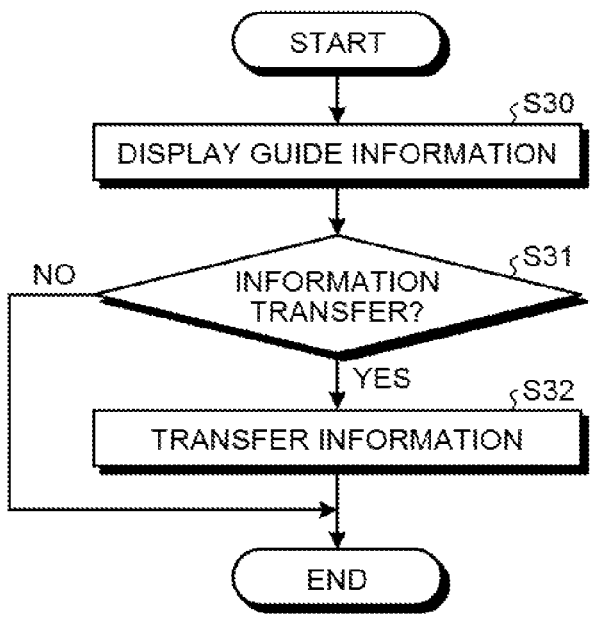
FIG. 8 is a flowchart illustrating an example of display processing.

FIG. 8 is a flowchart illustrating an example of the display processing. As illustrated in FIG. 8, when the display processing is started, the ATM controller 10 of the ATM 1 displays the guide information transmitted from the cooperation server 4 on the display screen of the display unit 13 or the external display device 19 (S30).

FIG. 9 is an explanatory drawing illustrating display of the guide information. Specifically, the upper part of FIG. 9 illustrates the case where sightseeing information is set as the guide information, and displayed on the display screen 210. The lower part of FIG. 9 illustrates the case where life information is set as the guide information, and displayed on the display screen 210.

As illustrated in FIG. 9, the display screen 210 of the display unit 13 displays the guide information 211 or 212 that is set as the output object based on the relation between the ATM identifier of the ATM 1 and the bank code read from the card C. For example, when the controller 40 determines that the transaction is transaction in another bank or transaction performed by the user being a visitor, based on the ATM identifier of the ATM 1 and the bank code read from the card C, sightseeing information is displayed as the guide information 211. When the controller 40 determines that the transaction is transaction in the own bank and performed by the user who is not a visitor, based on the ATM identifier of the ATM 1 and the bank code read from the card C, life information is displayed as the guide information 212.

For example, the user can be provided with sightseeing information, when the user uses the ATM 1 of a financial institution (another bank or a credit company) that is different from the bank in which the user has the account, in a place which the user has visited and which is distant from the user's usual living sphere, such as the user's living place and the working place. In addition, when the user can be provided with living information, when the user uses the ATM 1 of the regional bank in which the user has the account. As described above, the bank system 100 determines and provides information corresponding to the user, within the range of information obtained through transaction with the user, such as the ATM identifier of the ATM 1 used by the user and the bank code read from the card C.

Thereafter, the ATM controller 10 of the ATM 1 determines whether to transfer the guide information to a user's terminal device (such as a mobile terminal of the user) (S31). Specifically, the ATM controller 10 displays a guide to transfer the guide information to the user's terminal device on the display unit 13. Thereafter, the ATM controller 10 receives an operation to select presence/absence of transfer from the operating unit 14, to determine whether to transfer the guide information. When the guide information is to be transferred (Yes at S31), the ATM controller 10 transfers the guide information to the user's terminal device by short-range wireless communication via the wireless communication unit 16 (S32).

Figure 10:
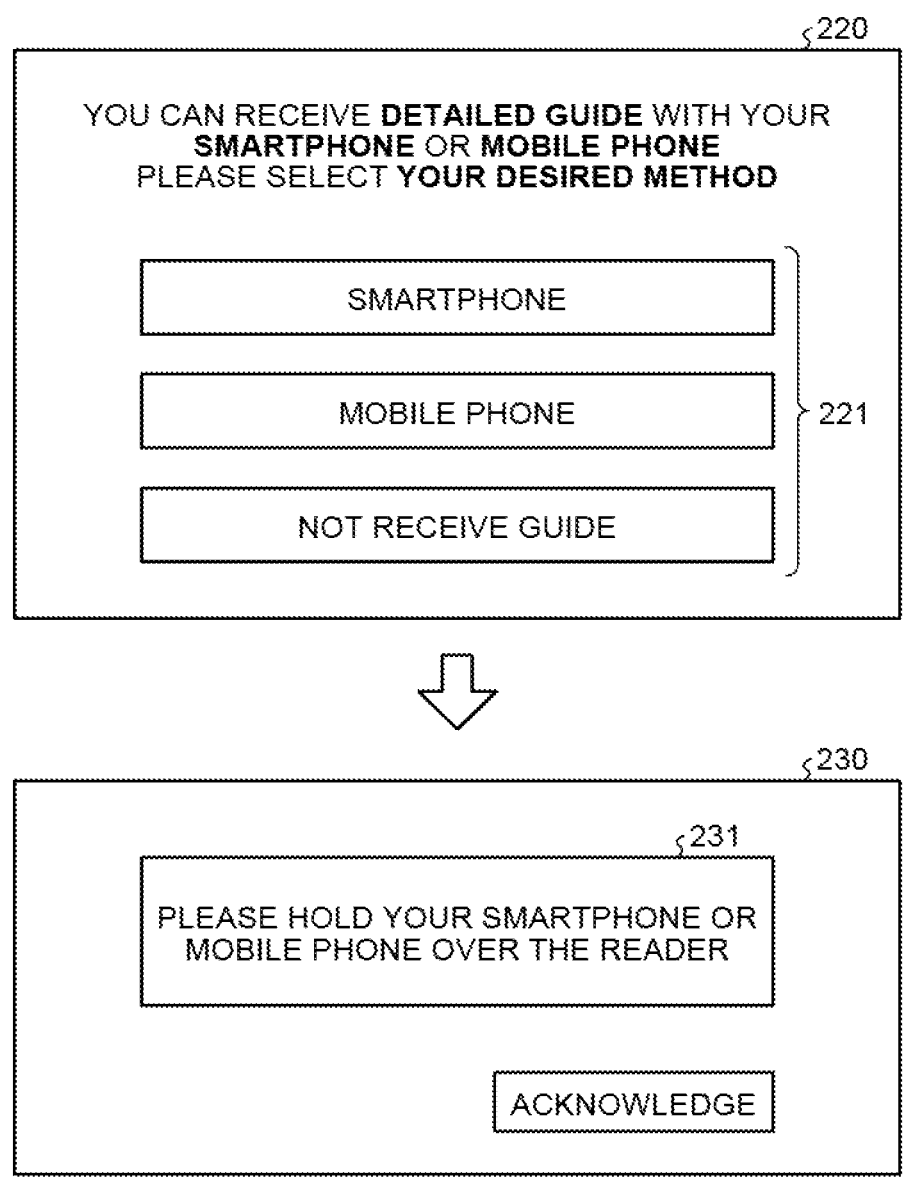
FIG. 10 is an explanatory drawing illustrating a display picture relating to transfer.

FIG. 10 is an explanatory drawing illustrating display pictures 220 and 230 relating to transfer. As illustrated in FIG. 10, at S31, the ATM controller 10 displays the display picture 220 to check whether to transfer the guide information to the user's terminal device such as a mobile phone on the display unit 13 or the external display device 19. The user selects a button image 221 displayed on the display picture 220 by operating (such as a touch operation) the operating unit 14, to instruct the bank system 100 whether to transfer the guide information to the user's terminal device. When the user issues an instruction to transfer the guide information to the user's terminal device, the ATM controller 10 displays the display picture 230 to prompt transfer on the display unit 13 or the external display device 19. Specifically, the ATM controller 10 displays operating information 231 to guide the user's terminal device to be placed within a communication range of short-range wireless communication in the wireless communication unit 16. In this manner, the user places one's own terminal device within a communication range of short-range wireless communication in the wireless communication unit 16, to transfer the guide information to the terminal device.

As described above, the guide information may be transferred and used to the user's terminal device using the ATM 1. For example, with the guide information transferred to the user's terminal device, the user is enabled to check the guide information in the terminal device even after the user goes away from the ATM 1. As an example, when a coupon ticket to be used in a predetermined shop is provided as guide information, the provided coupon ticket is transferred to the terminal device. In this manner, the user is enabled to display and use the transferred coupon ticket on the terminal device, when the user uses the shop.

In addition, the display processing to display the guide information described above is executed while the account system 5 executes processing corresponding to the transaction, such, as deposit, withdrawal, transfer, transfer between user's accounts in the same branch, and balance inquiry. This structure enables the bank system 100 to present the guide information to the user in a waiting time for which the account system 5 is performing processing corresponding to the transaction, and effectively use the transaction waiting time.

With reference to FIG. 5 again, the account system 5 executes processing corresponding to the transaction, such as deposit, withdrawal, transfer, transfer between user's accounts in the same branch, and balance inquiry, based on the information notified from the cooperation server 4, and transmits the processing result to the cooperation server 4 (S9). The controller 40 of the cooperation server 4 transmits the processing result from the account system 5 from the communication device 44 to the ATM 1 (S10).

The ATM controller 10 of the ATM 1 executes transaction processing on the ATM 1 side, based on the processing result from the account system 5 (S11). Specifically, when the transaction is withdrawal from the account, the ATM controller 10 counts the money stored in the custody unit 18a of the cash deposit/withdrawal unit 18, and pays out and outputs from the money outlet port. The ATM controller 10 also sends out the card C inserted through the insertion port.

Thereafter, the ATM controller 10 of the ATM 1 displays a transaction result on the display unit 13 (S12), and prints details of the transaction and guide information notified from the cooperation server 4 with the printing unit 15 (S13). The display of the transaction result may be performed after the display processing (S8) to display the guide information is finished. For example, when the display processing to display the guide information is being performed, the ATM controller 10 waits to display the transaction result until the display processing is finished. In this manner, the bank system 100 provides the user with the guide information. As described above, when the data transmitted at S4 is directly transmitted from the ATM 1 to the account system 5 separately from the transmission processing at S4 from the ATM 1 to the cooperation server 4, a series of processing of S4, S6, S7, and S8 can be modified to be executed at any timings other than the timings illustrated in FIG. 5 after the processing of S1. When the processing of S4 and S5 is performed as illustrated in FIG. 5, a series of processing of S6, S7, and S8 may be modified to be executed at any timings other than the timings illustrated in FIG. 5 after the processing of S4.

Figure 11:
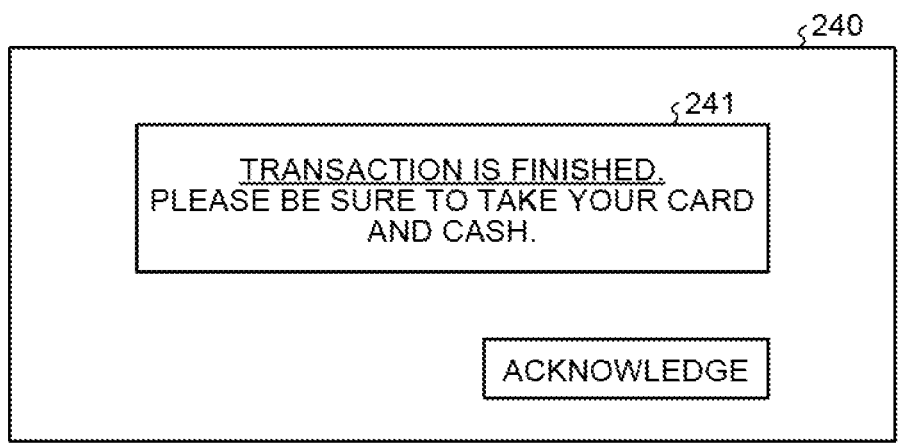
FIG. 11 is an explanatory drawing illustrating display of a transaction result.

FIG. 11 is an explanatory drawing illustrating display of a transaction result. As illustrated in FIG. 11, the ATM 1 displays notice information 241 indicating that withdrawal and discharge of the card C have been performed, in a transaction result display picture 240. The ATM 1 calls the user's attention with the notice information 241.

Figure 12:
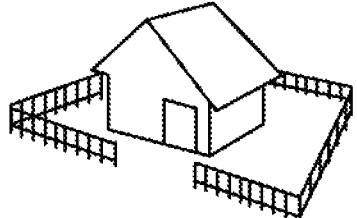
FIG. 12 is a diagram illustrating an example of a printed receipt.

FIG. 12 is a diagram illustrating an example of a printed receipt 300. As illustrated in FIG. 12, the receipt 300 includes printed detail information 301 indicating details of transaction, and printed guide information 302 notified from the cooperation server 4. The receipt 300 enables the user of the ATM 1 to see the provided sightseeing information or life information with the guide information 302 printed on the receipt 300, even after the user goes away from the ATM 1.

Figure 13:
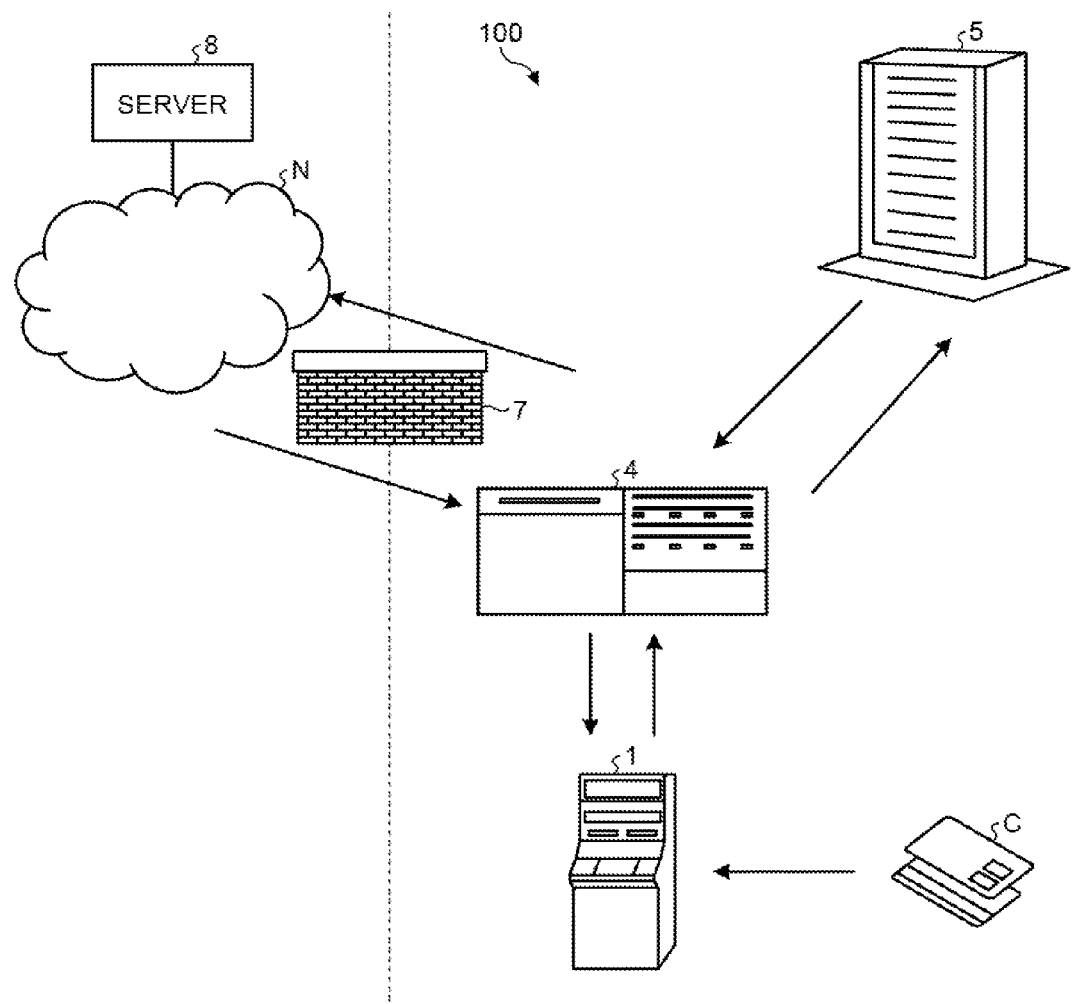
FIG. 13 is an explanatory drawing illustrating guide of sightseeing information in the bank system according to the first embodiment.

FIG. 13 is an explanatory drawing illustrating guide of sightseeing information in the bank system 100 according to the first embodiment. As illustrated in FIG. 13, the ATM 1 reads the recording data C1 including the bank code, the branch code, the account number, and the like of the account of the user from the card C. The ATM 1 transmits the read recording data C1 to the cooperation server 4 together with the ATM identifier thereof. The cooperation server 4 determines whether the transaction is transaction in the own bank or transaction in another bank, based on the ATM identifier obtained from the ATM 1 and the bank code of the recording data C1. Otherwise, the cooperation server 4 determines whether the transaction is transaction performed by the user who is not a visitor or transaction performed by the user who is a visitor. When the transaction is transaction in another bank or transaction performed by the user who is a visitor, the user is estimated to perform transaction in the ATM 1 of the visiting place that is distant from the user's usual living sphere, such as the user's living place and the working place. Accordingly, the cooperation server 4 obtains sightseeing information from the server 8, and provides the user of the ATM 1 with the information. In this manner, the user of the ATM 1 is enabled to be provided with sightseeing information in the visiting place, even when the user performs transaction with another bank and the user's customer information is not registered in the financial institution of the ATM 1.

Figure 14:
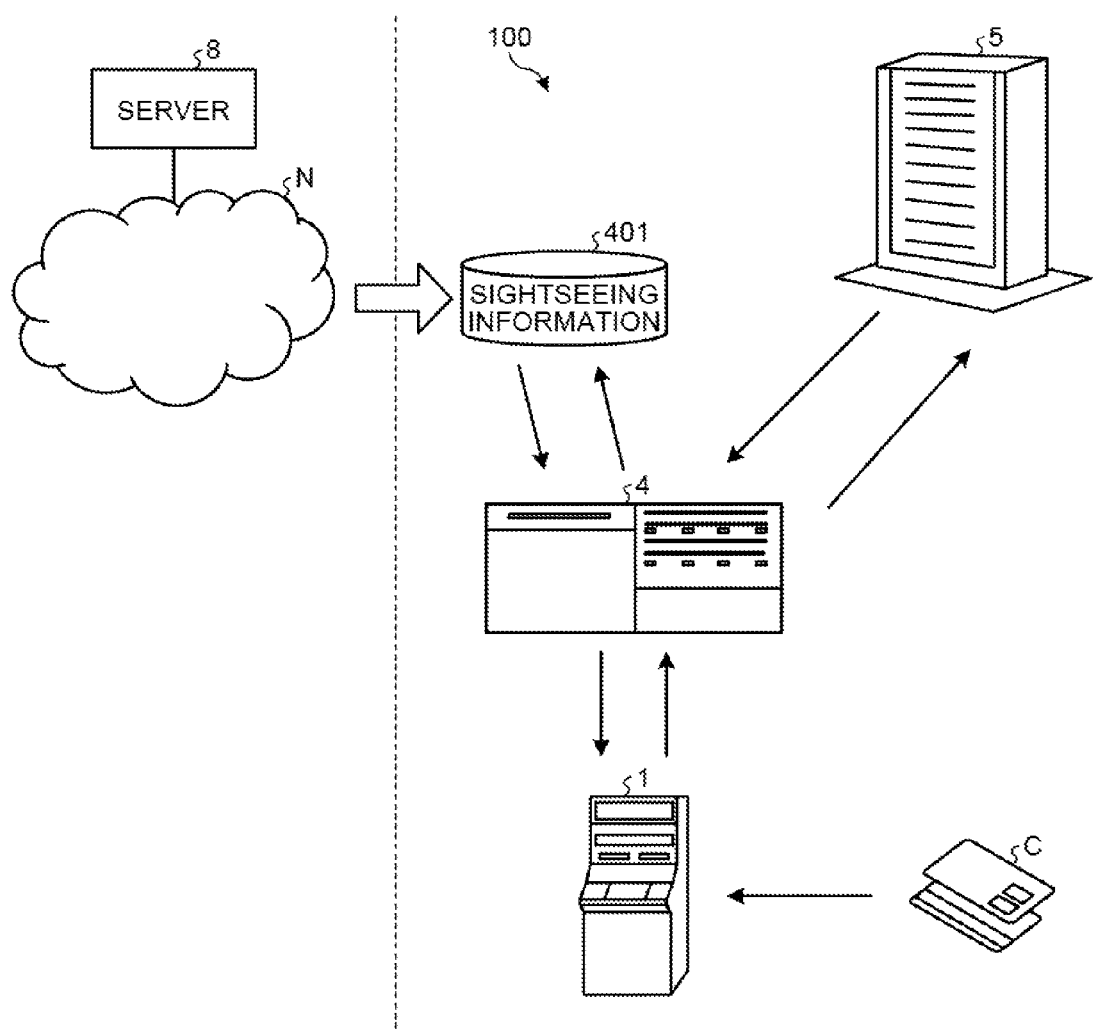
FIG. 14 is an explanatory drawing illustrating guide of sightseeing information in the bank system according to the first embodiment.

FIG. 14 is an explanatory drawing illustrating guide of sightseeing information in the bank system 100 according to the first embodiment. As illustrated in FIG. 14, sightseeing information 401 may be stored in advance in the data server 6 in the closed network of the bank system 100, by batch processing at night.

Figure 15:
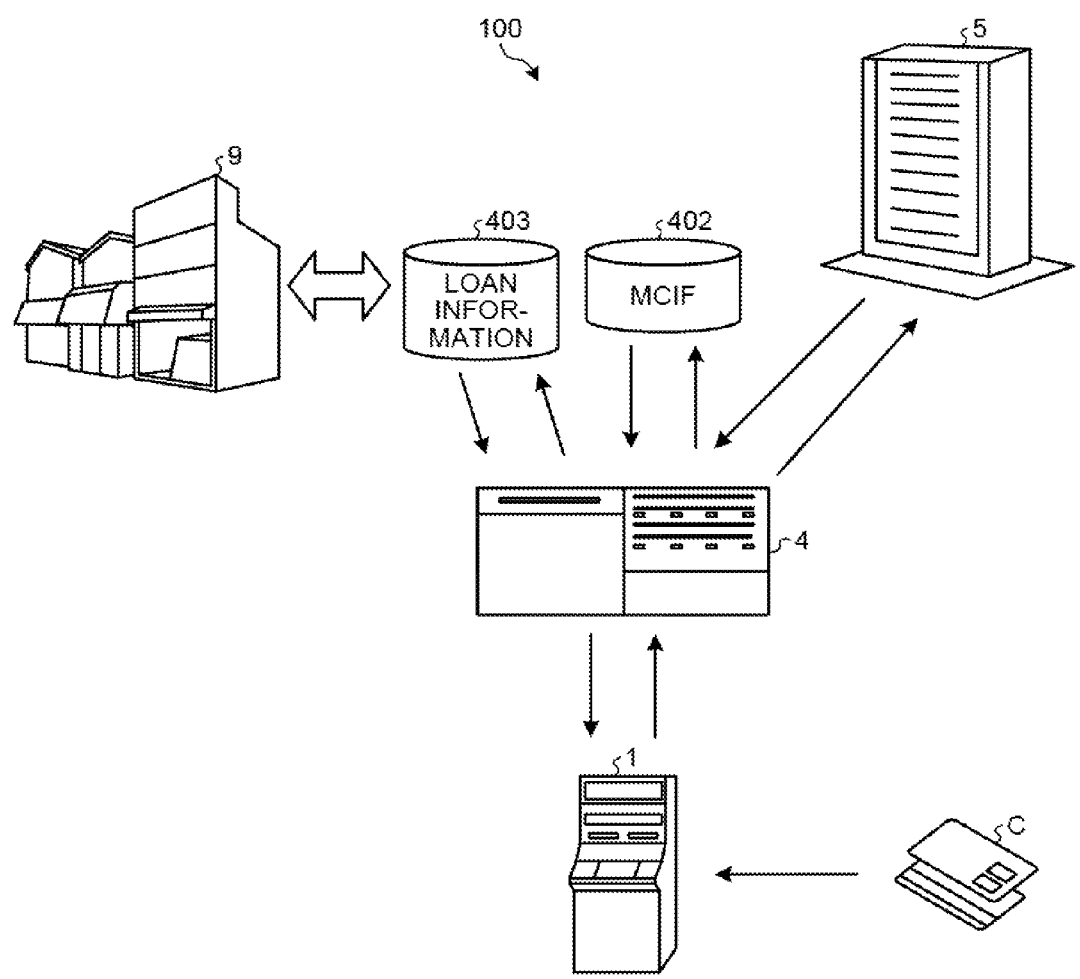
FIG. 15 is an explanatory drawing illustrating guide of life information in the bank system according to the first embodiment.

FIG. 15 is an explanatory drawing illustrating guide of life information in the bank system 100 according to the first embodiment. As illustrated in FIG. 15, the life information provided as guide information when the transaction is transaction in the own bank or transaction performed by the user who is a visitor may be based on the MCIF 402 or the loan information 403, as well as being obtained from the external server 8. The customer information in the MCIF 402 describes, for example, marketing-related information of the customer (such as the age group, the gender, and the annual income). The loan information 403 describes, for example, the category of business and the sales items of the loan customers 9, as information for the respective loan customers 9 of the bank. Accordingly, when the transaction is transaction in the own bank, because the customer information is obtained from the account number or the like of the recording data C1, the loan customer 9 can be provided with advertisements corresponding to the customer as life information.

Specifically, when the controller 40 of the cooperation server 4 determines that the transaction is transaction in the own bank based on the ATM identifier obtained from the ATM 1 and the bank code of the recording data C1, the controller 40 obtains customer information of the relevant customer from the MCIF 402 of the data server 6 based on the information such as the account number. Thereafter, the controller 40 selects the loan customer that belongs to the category of business and deals with sales items matching with the marketing-related information (such as the age group, the gender, and the annual income) of the obtained customer information, from the loan information 403. Thereafter, the controller 40 determines that advertisement information preset for the selected loan customer is the guide information. This structure provides the user of the ATM 1 with advertisement of the loan customer of the own bank, when the user performs transaction with the own bank.

[b] Second Embodiment

Figure 16:
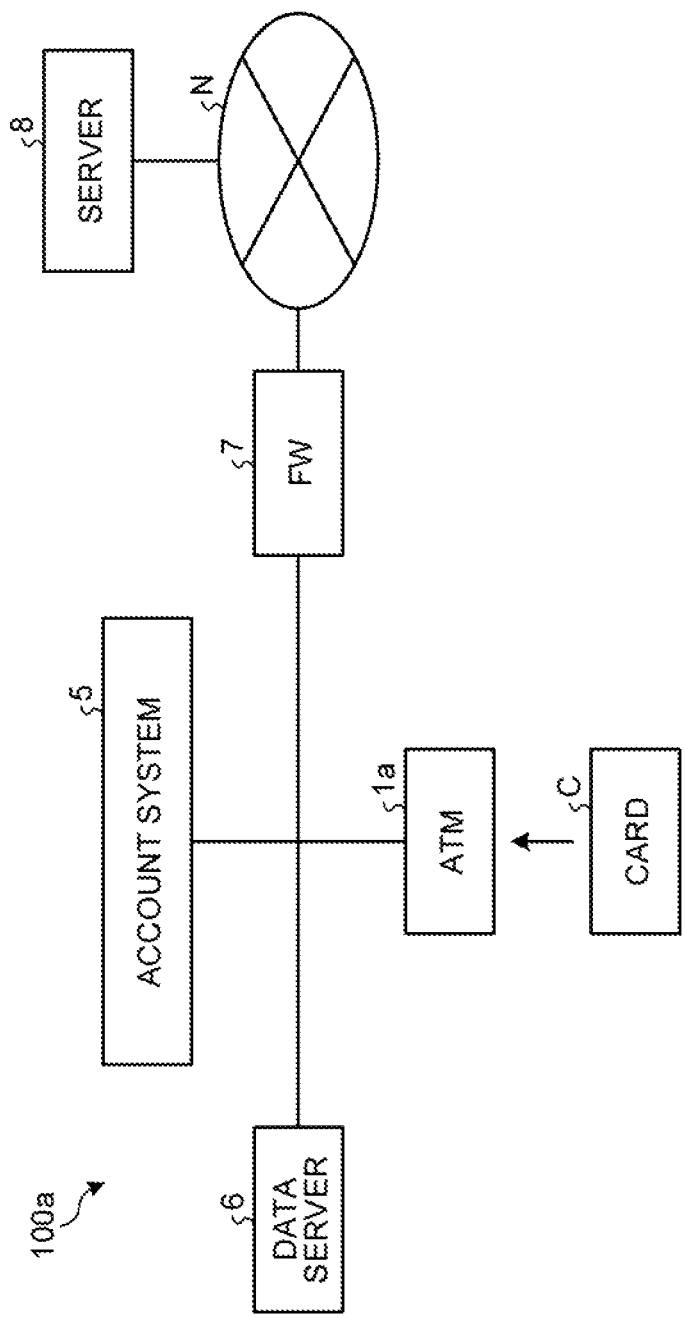
FIG. 16 is an explanatory drawing illustrating a configuration example of a bank system according to a second embodiment.

FIG. 16 is an explanatory drawing illustrating a configuration example of a bank system 100a according to the second embodiment. As illustrated in FIG. 16, the bank system 100a according to the second embodiment is different from the first embodiment, in that the bank system 100a includes an ATM 1a that is connected with the account system 5 without via the cooperation server 4. The configuration of the ATM 1a is the same as the configuration example of the ATM 1 illustrated in FIG. 3, and explanation thereof is omitted.

Figure 17:
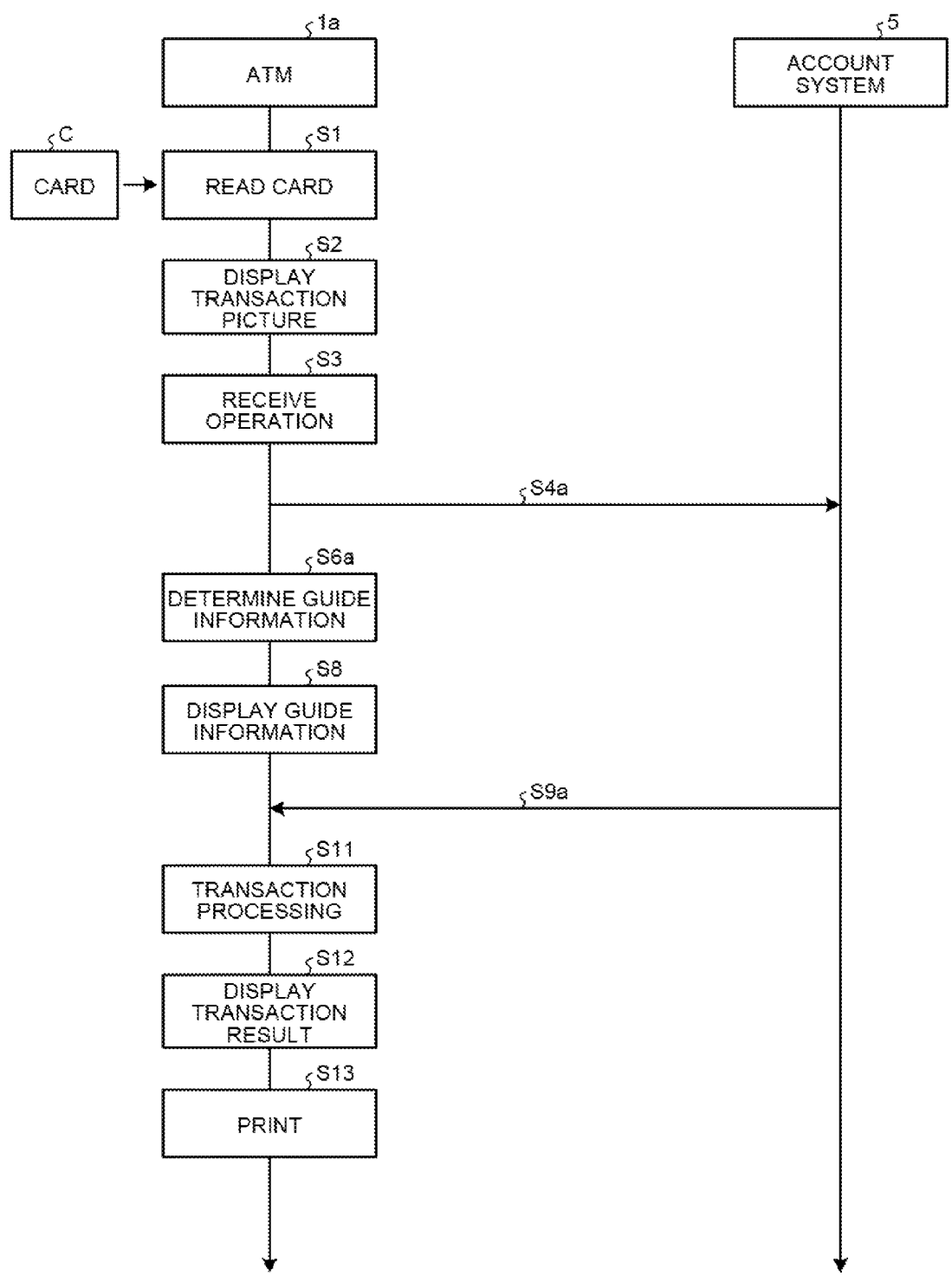
FIG. 17 is a ladder chart illustrating an operation example of the bank system according to the second embodiment.

FIG. 17 is a ladder chart illustrating an operation example of the bank system 100a according to the second embodiment. As illustrated in FIG. 17, the ATM controller 10 of the ATM 1a transmits the recording data C1 obtained from the card C, information as to the transaction received on the transaction picture 200 from the operating unit 14, and the ATM identifier of the ATM 1a, to the account system 5 via the network interface unit 12 (S4a). In this manner, the account system 5 executes processing corresponding to the transaction, such as deposit, withdrawal, transfer, transfer between user's accounts in the same branch, and balance inquiry.

Thereafter, the ATM controller 10 of the ATM 1a performs determination processing to determine guide information to be output in the ATM 1a, based on the relation between the ATM identifier thereof and the bank code read from the card C (S6a). The determination processing is the same as S6 in the cooperation server 4 described above, and explanation thereof is omitted.

Thereafter, the ATM controller 10 of the ATM 1a performs display processing (S8) to display the guide information determined at S6a, reception of the processing result from the account system 5 (S9a), transaction processing on the ATM 1a side (S11), display of the transaction result (S12), and printing on the receipt 300 (S13) in the same manner as the ATM 1. A series of processing of S6a and S8 may be modified to be executed at any timing other than the timing illustrated in FIG. 17, as long as they are performed after S1, For example, S6a and S8 may be executed after S12, as explained in FIG. 5.

Figure 18:
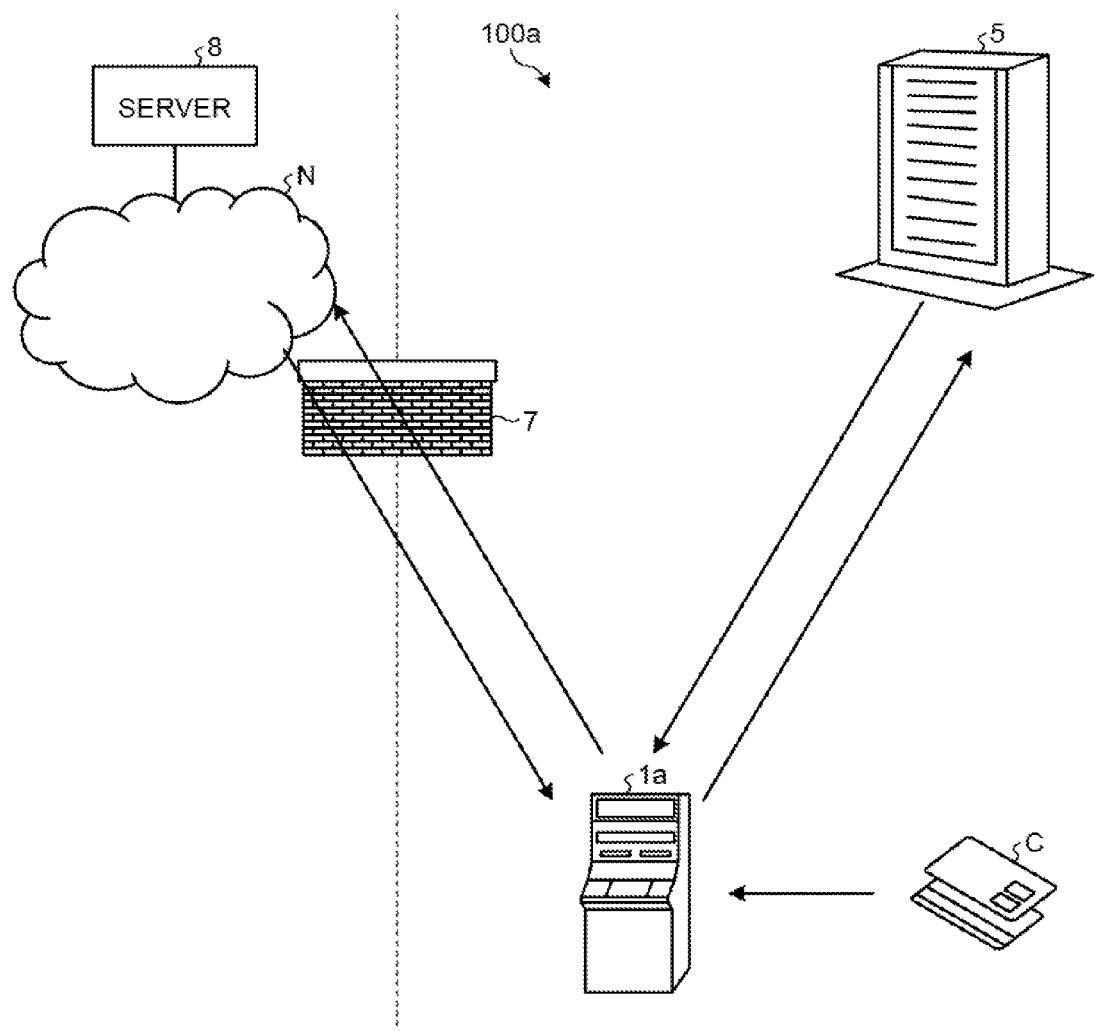
FIG. 18 is an explanatory drawing illustrating guide of sight seeing information in the bank system according to the second embodiment.

FIG. 18 is an explanatory drawing illustrating guide of sightseeing information in the bank system 100a according to the second embodiment. As illustrated in FIG. 18, the ATM 1a reads the recording data C1 including the bank code, the branch code, the account number, and the like of the account of the user from the card C. The ATM 1a determines whether the transaction is transaction in the own bank or transaction in another bank, based on the read recording data C1 and the ATM identifier thereof. Otherwise, the ATM 1a determines whether the transaction is transaction performed by the user who is not a visitor or transaction performed by the user who is a visitor. When the transaction is transaction in another bank or transaction performed by the user who is a visitor, the user is estimated to perform transaction in the ATM 1 of the visiting place that is distant from the user's usual living sphere, such as the user's living place and the working place. Accordingly, the ATM 1a obtains sightseeing information from the server 8, and provides the user of the ATM 1a with the information. In this manner, the user of the ATM 1a is enabled to be provided with sightseeing information in the visiting place, even when the user performs transaction with another bank and the user's customer information is not registered in the financial institution of the ATM 1a.

Figure 19:
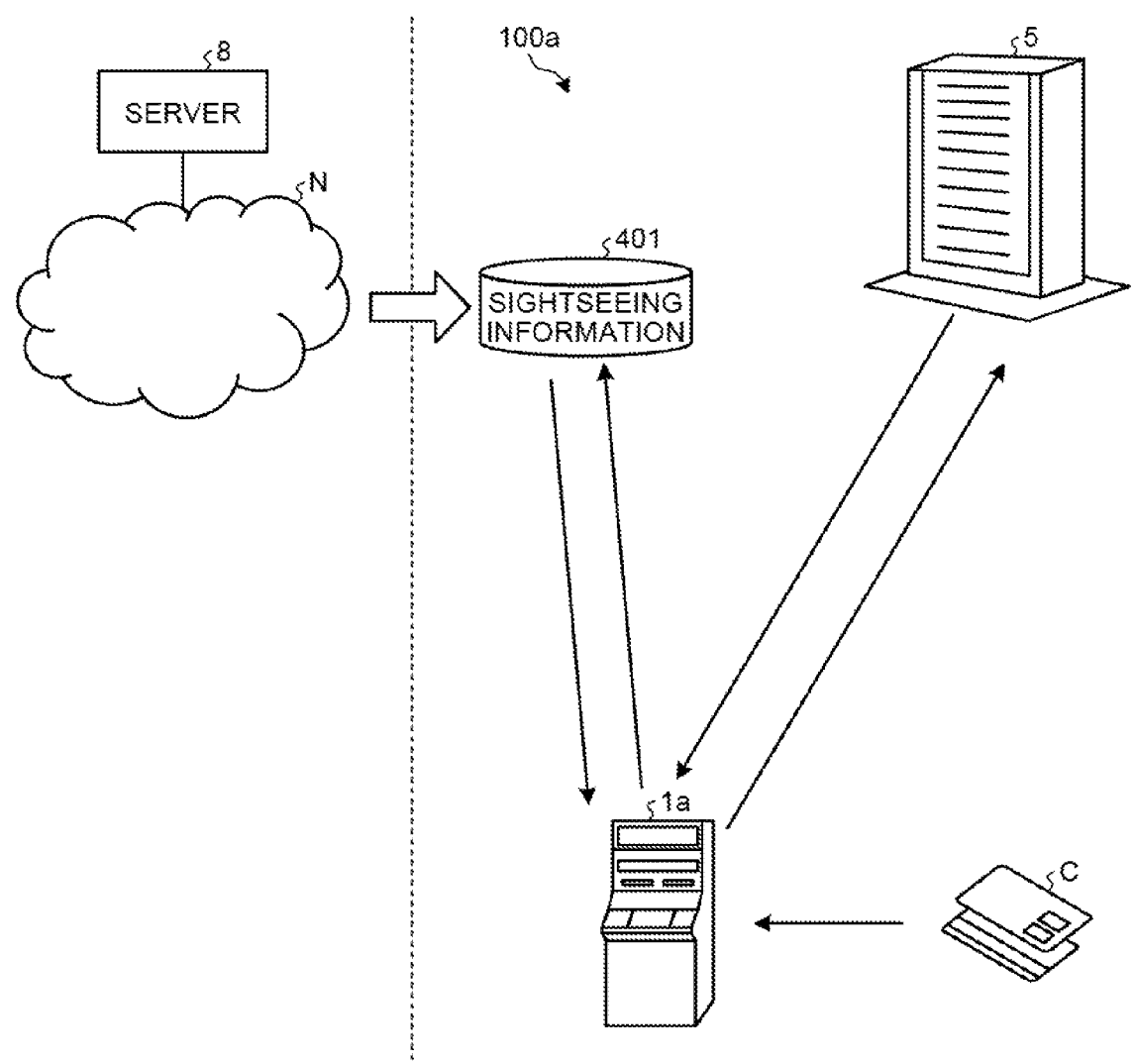
FIG. 19 is an explanatory drawing illustrating guide of sightseeing information in the bank system according to the second embodiment.

FIG. 19 is an explanatory drawing illustrating guide of sightseeing information in the bank system 100a according to the second embodiment. As illustrated in FIG. 19, the sightseeing information 401 may be stored in advance in the storage unit 11 of the ATM, by batch processing at night in the ATM controller 10 of the ATM 1a.

Figure 20:
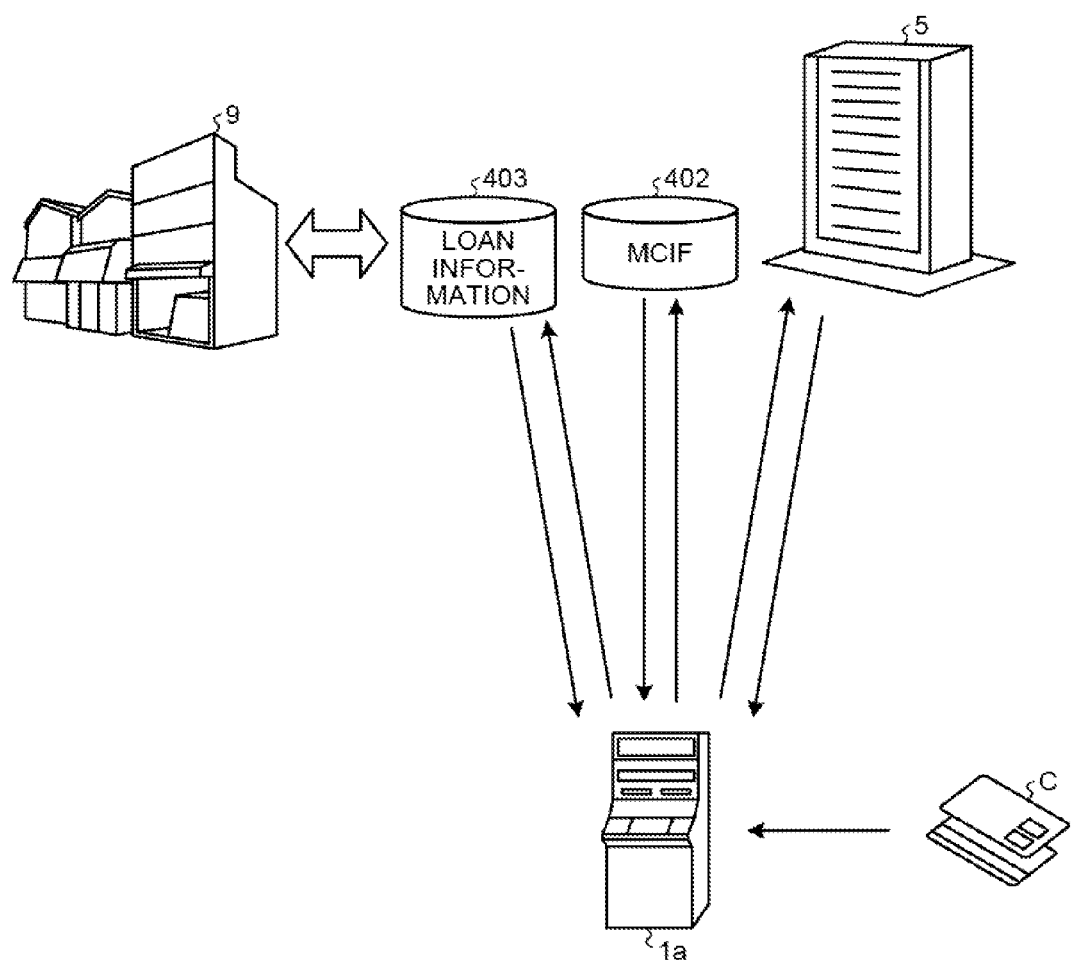
FIG. 20 is an explanatory drawing illustrating guide of life information in the bank system according to the second embodiment.

FIG. 20 is an explanatory drawing illustrating guide of life information in the bank system 100a according to the second embodiment. As illustrated in FIG. 20, the life information provided as guide information when the transaction is transaction in the own bank or transaction performed by the user who is a visitor may be based on the MCIF 402 or the loan information 403, as well as being obtained from the external server 8, in the same manner as the ATM 1 described above.

Specifically, when the ATM controller 10 of the ATM 1a determines that the transaction is transaction in the own bank based on the ATM identifier thereof and the bank code of the recording data C1, the ATM controller 10 obtains customer information of the relevant customer from the MCIF 402 of the data server 6 based on the information such as the account number. Thereafter, the ATM controller 10 selects the loan customer 9 that belongs to the category of business and deals with sales items matching with the marketing-related information (such as the age group, the gender, and the annual income) of the obtained customer information, from the loan information 403. Thereafter, the ATM controller 10 determines that advertisement information preset for the selected loan customer 9 is the guide information. This structure provides the user of the ATM 1a with advertisement of the loan customer 9 of the own bank, when the user performs transaction with the own bank.

[c] First Modification

In a first modification, the guide information is determined based on the relation between a combination of the bank code and the branch code included in the recording data C1 of the card C and the ATM identifier. Specifically, a combination between the bank code and the branch code enables specification of the bank and the branch of the bank, with reference to information called banking information file (BIF) that associates "financial institution code and branch code" with "financial institution name and branch name". Accordingly, based on the branch of the bank specified with the combination between the bank code and the branch code, the area in which the branch is located is specified, with reference to master data storing, for example, map information and the location information of branch offices of financial institutions. The ATM identifier enables specification of the area in which the ATM 1 is installed, with reference to the installation information.

Accordingly, the first modification has the structure of determining whether the guide information is set to sightseeing information or life information, based on whether the area in which the branch is located which is specified with the combination of the bank code and the branch code agrees with the installed area of the ATM 1. For example, when the location area of the branch related to the card C does not agree with the installed area of the ATM 1, the user is estimated to perform transaction in the ATM 1 in the visiting place distant from the user's usual living sphere, such as the user's living place and the working place. For this reason, when the areas do not agree, the user is provided with sightseeing information. When the location area of the branch related to the card C agrees with the installed area of the ATM 1, the user is estimated to perform transaction in the ATM 1 in the user's living sphere. For this reason, when the areas agree, the user is provided with life information.

Figure 21:
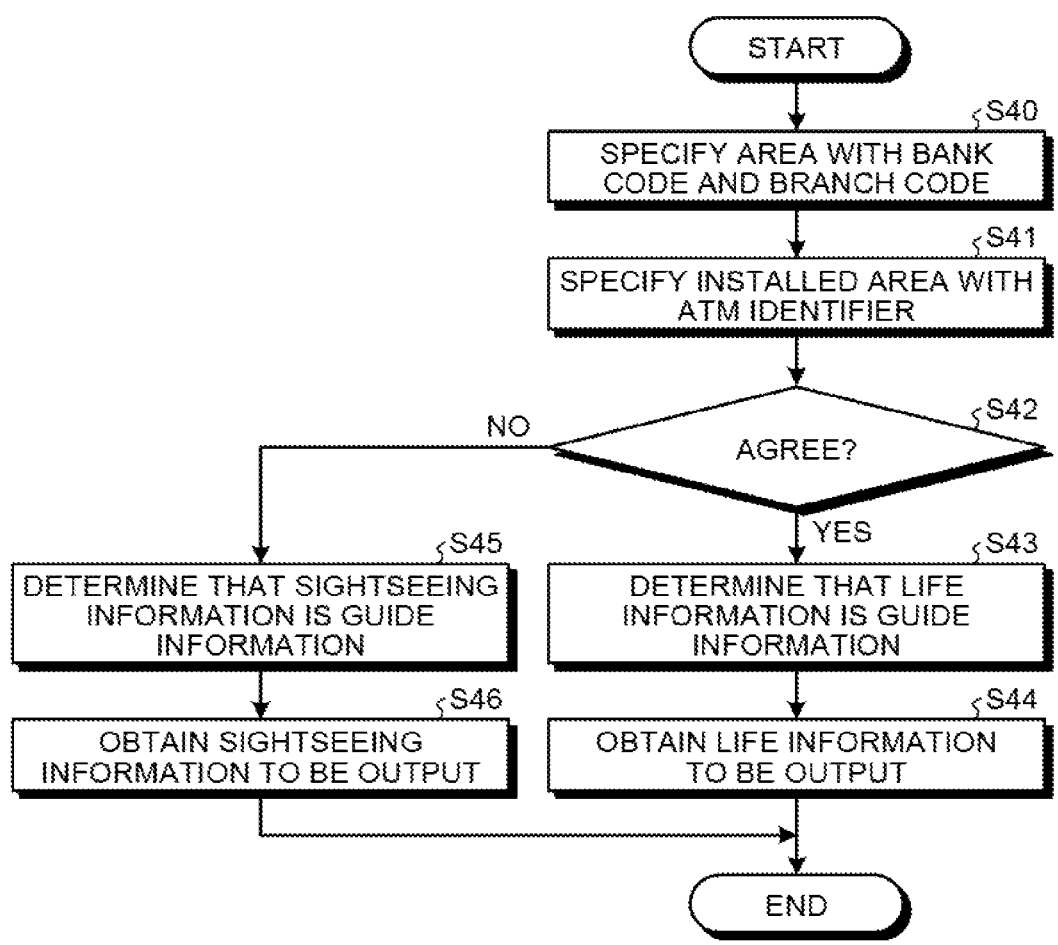
FIG. 21 is a flowchart illustrating a first modification of the determination processing.

FIG. 21 is a flowchart illustrating the first modification of the determination processing. As illustrated in FIG. 21, when the determination processing is started, the controller 40 of the cooperation server 4 specifies the area of the branch including the user's account, based on the bank code and the branch code read from the card C (S40). Specifically, the controller 40 specifies the branch including the account with a unified format, based on the bank code and the branch code read from the card C. Thereafter, the controller 40 specifies the area in which the branch is located, with reference to map information describing addresses of branches. For example, the controller 40 specifies the city, town, and/or village where the branch is located.

Thereafter, the controller 40 of the cooperation server 4 specifies the installed area of the ATM 1, with reference to the installation information describing installed places (addresses) of the ATMs 1 for respective ATM identifiers, based on the ATM identifier obtained from the ATM 1 (S41). For example, the controller 40 specifies the city, town, and/or village where the ATM 1 is installed.

Thereafter, the controller 40 of the cooperation server 4 determines whether the area of the branch including the user's account agrees with the installed area of the ATM 1 (S42). For example, the controller 40 determines whether the city, town, and/or village where the user's branch is located agrees with the city, town, and/or village where the ATM 1 is installed. The determination as to whether the areas agree may be performed for the unit of prefecture, as well as for the city, town, and/or village, and the size of the area is not limited. In addition, the controller 40 may determine that the areas agree, when parts of the areas overlap, and the whole areas are not required to agree.

When the areas agree at S42 (Yes at S42), the controller 40 determines that life information is the guide information (S43), and obtains the life information to be output in the ATM 1 from the server 8 (S44). Specifically, the controller 40 reads the URL of the server 8 that discloses the life information from the setting information stored in advance in the storage device 41, and accesses the read URL to obtain the life information.

When the areas do not agree at S42 (No at S42), the controller 40 determines that sightseeing information is the guide information (S45), and obtains sightseeing information to be output in the ATM 1 from the server 8 (S46). Specifically, the controller 40 reads the URL of the server 8 that discloses the sightseeing information from the setting information stored in advance in the storage device 41, and accesses the read URL to obtain the sightseeing information.

The ATM 1a may perform the determination processing according to the first modification, in the same manner as the second embodiment. The sightseeing information may be obtained in advance by batch processing, in the same manner as in FIG. 14 and FIG. 19. The life information may be based on the MCIF 402 and the loan information 403, in the same manner as in FIG. 15 and FIG. 20.

[d] Second Modification

In a second modification, the guide information is determined based on the relation between the area specified with the branch code of the card C and the area specified with the ATM identifier. For example, city banks have branches in main cities such as prefectural capitals of the prefectures. For this reason, the card C of a city bank may be used for transaction performed in the ATM 1 installed in a branch that is far distant from the user's usual living sphere, such as the user's living place and working place. Accordingly, the second modification has the structure of determining whether the guide information is set to sightseeing information or life information, in accordance with the distance between the area including the branch specified by the branch code and the installed area of the ATM 1.

Figure 22:
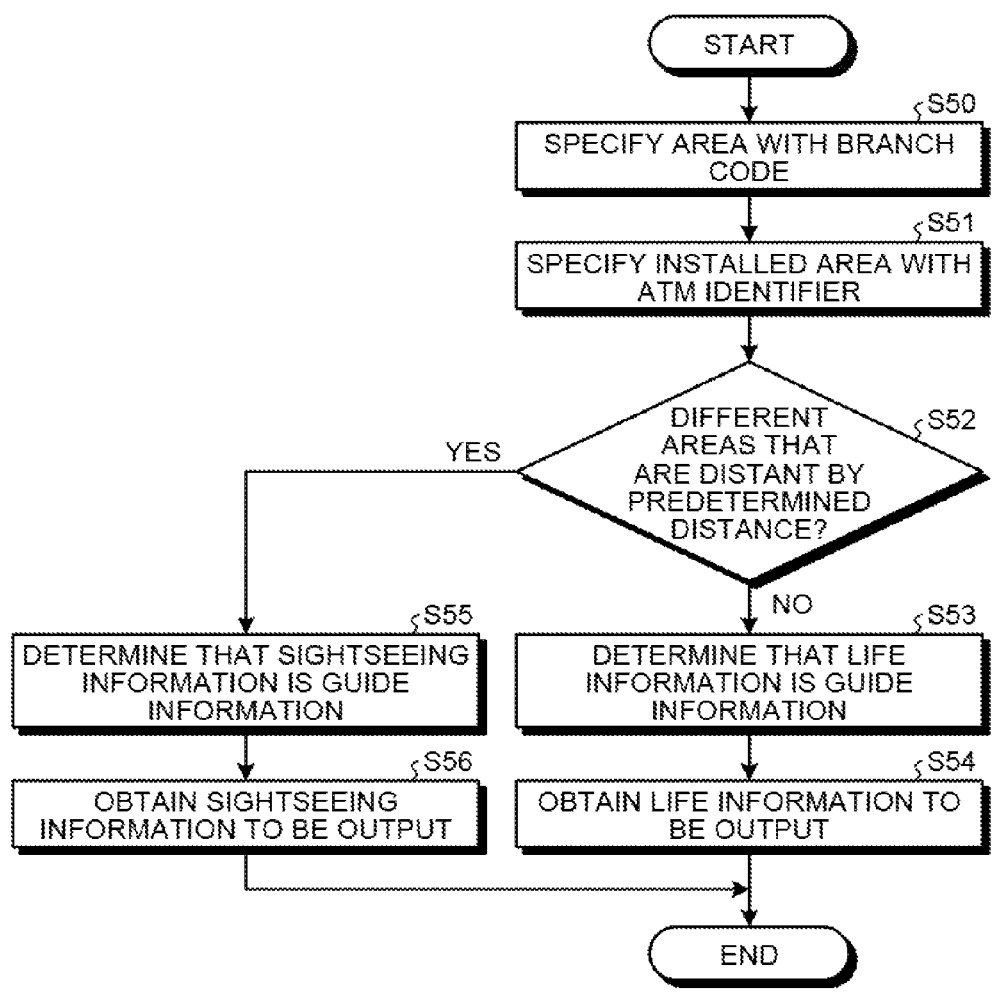
FIG. 22 is a flowchart illustrating a second modification of the determination processing.

FIG. 22 is a flowchart illustrating the second modification of the determination processing. As illustrated in FIG. 22, when the determination processing is started, the controller 40 of the cooperation server 4 specifies the area of the branch including the user's account, based on the branch code read from the card C (S50). Specifically, the controller 40 specifies the branch including the account with a unified format, based on the branch code read from the card C. Thereafter, the controller 40 specifies the area in which the branch is located, with reference to map information describing addresses of branches. For example, the controller 40 specifies the city, town, and/or village where the branch is located.

Thereafter, the controller 40 of the cooperation server 4 specifies the installed area of the ATM 1, with reference to the installation information describing installed places (addresses) of the ATMs 1 for respective ATM identifiers, based on the ATM identifier obtained from the ATM 1 (S51). For example, the controller 40 specifies the city, town, and/or village where the ATM 1 is installed.

Thereafter, the controller 40 of the cooperation server 4 determines whether the area of the branch including the user's account and the installed area of the ATM 1 are different areas that are distant from each other by a predetermined distance or more (S52). For example, the controller 40 determines whether the areas are distant from each other by a moving distance (for example, 200 kilometers) by which the user is assumed to move in the usual life from the city, town, and/or village where the user's branch is located. The distance value used for the determination may be set to a characteristic value such as 200 kilometers, or distance values may be set for respective banks specified with bank codes. For example, a distance value used for determination for a city bank may be set larger than a distance value for a regional bank, because a city bank is assumed to be used in a vide area.

When the areas are not different areas that are distant from each other by a predetermined distance at S52 (No at S52), the controller 40 determines that life information is the guide information (S53), and obtains life information to foe output in the ATM 1 from the server 8 (S54). Specifically, the controller 40 reads the URL of the server 8 that discloses the life information from the setting information stored in advance in the storage device 41, and accesses the read URL to obtain the life information.

When the areas are different areas that are distant from each other by a predetermined distance at S52 (Yes at S52), the controller 40 determines that sightseeing information is the guide information (S55), and obtains sightseeing information to be output in the ATM 1 from the server 8 (S56). Specifically, the controller 40 reads the URL of the server 8 that discloses the sightseeing information from the setting information stored in advance in the storage device 41, and accesses the read URL to obtain the sightseeing information.

The ATM 1a may perform the determination processing according to the second modification, in the same manner as the second embodiment. The sightseeing information may be obtained in advance by batch processing, in the same manner as in FIG. 14 and FIG. 19. The life information may be based on the MCIF 402 and the loan information 403, in the same manner as in FIG. 15 and FIG. 20.

An embodiment of the present invention enables determination and provision of information corresponding to the user within a range of information obtained in transaction.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information providing system comprising:
   a processor that executes a process including:
   receiving an identifier to uniquely identify an automatic transaction apparatus in which transaction is performed, and an input of a financial institution code read from a card inserted into the automatic transaction apparatus;
   determining information to be output in the automatic transaction apparatus based on a relation between the financial institution code and the identifier of the automatic transaction apparatus; and
   displaying life information on a screen of the automatic transaction apparatus or an external display device controlled by the automatic transaction apparatus when the transaction is in an own bank, and displaying sightseeing information on the screen of the automatic transaction apparatus or the external display device when the transaction is in another bank.

2. The information providing system according to claim 1, wherein
   the receiving includes receiving an input of a branch code read from the card, and
   the determining includes determining the information to be output in the automatic transaction apparatus, based on a relation between a combination between the financial institution code and the branch code and the identifier of the automatic transaction apparatus.

3. The information providing system according to claim 1, wherein the determining includes determining different information as the information to be output according to whether an area specified with the financial institution code or a combination between the financial institution code and a branch code does not agree with an installed area of the automatic transaction apparatus specified with the identifier of the automatic transaction apparatus.

4. The information providing system according to claim 1, wherein
the receiving includes receiving an input of a transaction type, a transaction sum, and an account number read from the card, and
the process further includes:
performing transaction processing specified with the transaction type for the transaction sum on an account specified with the financial institution code, a branch code, and the account number received from the automatic transaction apparatus; and
causing the automatic transaction apparatus to perform the displaying while performing the transaction processing.

5. The information providing system according to claim 1, wherein
the receiving includes receiving an input of a transaction type, a transaction sum, and an account number read from the card, and
the process further includes:
performing transaction processing specified with the transaction type for the transaction sum on an account specified with the financial institution code, a branch code, and the account number received from the automatic transaction apparatus; and
after display of the information on the screen of the automatic transaction apparatus is finished, causing the screen of the automatic transaction apparatus to display information relating to a result of the performed transaction processing.

6. The information providing system according to claim 1, wherein
the receiving includes receiving an input of a transaction type, a transaction sum, and an account number read from the card, and
the process further includes:
performing transaction processing specified with the transaction type for the transaction sum on an account specified with the financial institution code, a branch code, and the account number received from the automatic transaction apparatus; and
causing the automatic transaction apparatus to print a receipt including details of the transaction processing and the information.

7. An information providing method comprising:
receiving an identifier to uniquely identify an automatic transaction apparatus in which transaction is performed, and an input of a financial institution code read from a card inserted into the automatic transaction apparatus, by a processor;
determining information to be output in the automatic transaction apparatus based on a relation between the financial institution code and the identifier of the automatic transaction apparatus, by the processor; and
displaying life information on a screen of the automatic transaction apparatus or an external display device controlled by the automatic transaction apparatus when the transaction is in an own bank, and displaying sightseeing information on the screen of the automatic transaction apparatus or the external display device when the transaction is in another bank, by the processor.

8. An information providing system comprising:
a processor that executes a process including:
obtaining a branch code from a card to be processed by an automatic transaction apparatus;
causing the automatic transaction apparatus to output sightseeing information relating to a first area in which the automatic transaction apparatus is installed, when the information providing system detects that the obtained branch code is a branch code of a branch in an area that is different from the first area; and
displaying life information on a screen of the automatic transaction apparatus or an external display device controlled by the automatic transaction apparatus when the transaction is in an own bank, and displaying sightseeing information on the screen of the automatic transaction apparatus or the external display device when the transaction is in another bank.

9. The information providing system according to claim 8, wherein the information providing system causes the automatic transaction apparatus to output life information relating to the first area, when the information providing system detects that the obtained branch code is a branch code of a branch in the first area in which the automatic transaction apparatus is installed.

* * * * *